US012530460B2

(12) United States Patent
Salman et al.

(10) Patent No.: US 12,530,460 B2
(45) Date of Patent: Jan. 20, 2026

(54) AUTOMATED GOVERNANCE POLICY-BASED SECURITY FOR A CLOUD NATIVE APPLICATION

(71) Applicant: Microsoft Technology Licensing, LLC, Redmond, WA (US)

(72) Inventors: Tamer Salman, Haifa (IL); Fady Copty, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/680,868

(22) Filed: May 31, 2024

(65) Prior Publication Data

US 2025/0371157 A1  Dec. 4, 2025

(51) Int. Cl.
*G06F 21/57* (2013.01)

(52) U.S. Cl.
CPC ........ *G06F 21/57* (2013.01); *G06F 2221/033* (2013.01)

(58) Field of Classification Search
CPC ............................ G06F 21/57; G06F 2221/033
See application file for complete search history.

(56) References Cited

U.S. PATENT DOCUMENTS

| | | | | |
|---|---|---|---|---|
| 11,063,828 | B2* | 7/2021 | Knudsen | H04L 41/0813 |
| 12,363,140 | B2* | 7/2025 | Williams-Koroma | H04L 63/145 |
| 2022/0147637 | A1* | 5/2022 | Melamed | G06F 21/6218 |
| 2022/0342846 | A1* | 10/2022 | Kunchakarra | G06F 11/3688 |
| 2023/0205891 | A1* | 6/2023 | Yellapragada | H04L 63/1416 726/25 |
| 2023/0208870 | A1* | 6/2023 | Yellapragada | H04L 63/20 726/22 |
| 2023/0229781 | A1* | 7/2023 | Stolbikov | G06N 20/00 |

(Continued)

OTHER PUBLICATIONS

"Azure Policy Built-in Policy Definitions", Retrieved from https://learn.microsoft.com/en-us/azure/governance/policy/samples/built-in-policies, Jun. 23, 2025, 159 Pages.

(Continued)

*Primary Examiner* — Beemnet W Dada
(74) *Attorney, Agent, or Firm* — Wade IP Law PLLC

(57) ABSTRACT

Techniques are described herein that are capable of providing automated governance policy-based security for a cloud native application. Recently unused security misconfigurations of a cloud native application are identified. A first configuration change that resolves a first recently unused security misconfiguration is automatically implemented as a result of the first configuration change being capable of reducing productivity of a user and having a likelihood of reducing security of the cloud native application that is greater than or equal to a likelihood threshold. A second configuration change that resolves a second recently unused security misconfiguration is automatically implemented, and a governance policy, which defines a security action to perform with regard to a future attempt to implement the second recently unused security misconfiguration, is automatically generated, as a result of the second configuration change being capable of compromising access of an end user to a version of the cloud native application.

20 Claims, 6 Drawing Sheets

(56) References Cited

U.S. PATENT DOCUMENTS

2024/0020388 A1* 1/2024 Goodman ............. G06F 21/575

OTHER PUBLICATIONS

"Azure Policy Definition Structure Basics", Retrieved form https://learn.microsoft.com/en-us/azure/governance/policy/concepts/definition-structure-basics, Mar. 4, 2025, 07 Pages.

"Manage Personal Access Tokens Using Policies (For Administrators)", Retrieved from https://learn.microsoft.com/en-us/azure/devops/organizations/accounts/manage-pats-with-policies-for-administrators?view=azure-devops, Jun. 12, 2025, 09 Pages.

"Tutorial: Adding User Assigned Managed Identities to Existing Virtual Machines or Virtual Machine Scale Sets", Retrieved from https://learn.microsoft.com/en-us/azure/governance/policy/tutorials/modify-virtual-machine-identity, Mar. 4, 2025, 07 Pages.

"What is Azure Policy?", Retrieved from https://learn.microsoft.com/en-us/azure/governance/policy/overview, Mar. 4, 2025, 10 Pages.

* cited by examiner

AUTOMATED GOVERNANCE POLICY-BASED SECURITY FOR A CLOUD NATIVE APPLICATION

BACKGROUND

A cloud native application is an application (e.g., a software program) that includes microservices, which are configured to run in a cloud environment. The microservices are self-contained pieces of business functionality that are capable of being developed, deployed, and scaled independently from the other microservices. The microservices often communicate via lightweight protocol(s), such as hypertext transfer protocol (HTTP).

A cloud native application typically is developed in accordance with a software development lifecycle (SDLC). An SDLC is a process of planning and managing software development. For instance, the SDLC may define a series of steps to be completed during development of the cloud native application and/or a series of environments (e.g., planning, analysis, design, development, testing, deployment, and maintenance) in which the cloud native application is to be developed. Testing of the cloud native applications traditionally occurs at a relatively late phase of the SDLC, and the cloud native application is then sent back to the development team to correct issues (e.g., security vulnerabilities) that are discovered during the testing, which often results in a bottleneck in the SDLC.

SUMMARY

A recent trend has been to shift (a.k.a. "shift-left") responsibility for security of cloud native applications from security teams to development and operations teams, which are referred to collectively as "DevOps." However, DevOps often is unable to adequately address the number of security vulnerabilities that are discovered in a cloud native application, which increases the susceptibility of the cloud native application to malicious attacks.

It may be desirable to automatically increase security of a cloud native application by reducing a number of security vulnerabilities in the cloud native application. For instance, misconfigurations of the native application may be identified, and configuration changes may be automatically implemented in the cloud native application to resolve the misconfigurations. Examples of a misconfiguration include but are not limited to a permission or functionality that is no longer necessary to achieve its intended purpose, a permission or functionality that was inadvertently created, and a permission or functionality that was maliciously created (i.e., created by a malicious entity). Any of a variety of factors may be used to determine whether to implement the configuration changes. For example, the configuration changes may be categorized among multiple categories based on (e.g., based at least on) negative consequences that the configuration changes are capable of causing, likelihoods that the configuration changes will cause the negative consequences, and so on. Examples of a negative consequence include but are not limited to productivity of a user (e.g., developer or an end user) of the cloud native application being reduced, access of a user to the cloud native application (or a version thereof) being compromised, and security of the cloud native application being reduced. A determination whether to implement a configuration change may be based on a category in which the configuration change is categorized, an amount of time since a security misconfiguration that the configuration change is configured to resolve has been used, and so on. Governance policies may be generated to control whether and/or under what conditions a misconfiguration, which is resolved by implementing a corresponding configuration change, is allowed to occur in the future.

Various approaches are described herein for, among other things, providing automated governance policy-based security for a cloud native application. For instance, the approaches may resolve recently unused security misconfigurations of the cloud native application using categorization and one or more governance policies. In an example approach, first configuration changes, which are included in a plurality of configuration changes that are configured to resolve a plurality of security misconfigurations of a cloud native application, are categorized into a first category. Categorization of the first configuration changes is based at least on (e.g., as a result of or in response to) the first configuration changes being capable of reducing productivity of a user of the cloud native application who has uncompromised access to the cloud native application. The categorization of the first configuration changes is further based at least on the first configuration changes having a likelihood of reducing security of the cloud native application that is greater than or equal to a likelihood threshold. Second configuration changes, which are included in the plurality of configuration changes, are categorized into a second category as a result of the second configuration changes being capable of compromising access of an end user to a version of the cloud native application. A plurality of recently unused security misconfigurations are identified in the plurality of security misconfigurations as a result of the plurality of recently unused security misconfigurations being unused for at least a designated duration of time that ends at a current time. The first configuration changes, which resolve first recently unused security misconfigurations in the plurality of recently unused security misconfigurations, are automatically implemented. The second configuration changes, which resolve second recently unused security misconfigurations in the plurality of recently unused security misconfigurations, are automatically implemented. Governance policies are automatically generated. The governance policies define security actions to perform with regard to future attempts to implement the second recently unused security misconfigurations.

In another example approach, a plurality of recently unused security misconfigurations are identified in a plurality of security misconfigurations of a cloud native application as a result of the plurality of recently unused security misconfigurations being unused for at least a designated duration of time that ends at a current time. A first configuration change that resolves a first recently unused security misconfiguration in the plurality of recently unused security misconfigurations is automatically implemented. Automatic implementation of the first configuration change is based at least on (e.g., as a result of or in response to) the first configuration change being capable of reducing productivity of a user of the cloud native application who has uncompromised access to the cloud native application. The automatic implementation of the first configuration change is further based at least on the first configuration change having a likelihood of reducing security of the cloud native application that is greater than or equal to a likelihood threshold. A second configuration change that resolves a second recently unused security misconfiguration in the plurality of recently unused security misconfigurations is automatically implemented as a result of the second configuration change being capable of compromising access of an end user to a version of the cloud native application. A governance policy is automatically generated as the result of the second configuration change being capable of compromising access of the end user to the version of the cloud native application. The governance policy defines a security action to perform with regard to a future attempt to implement the second recently unused security misconfiguration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
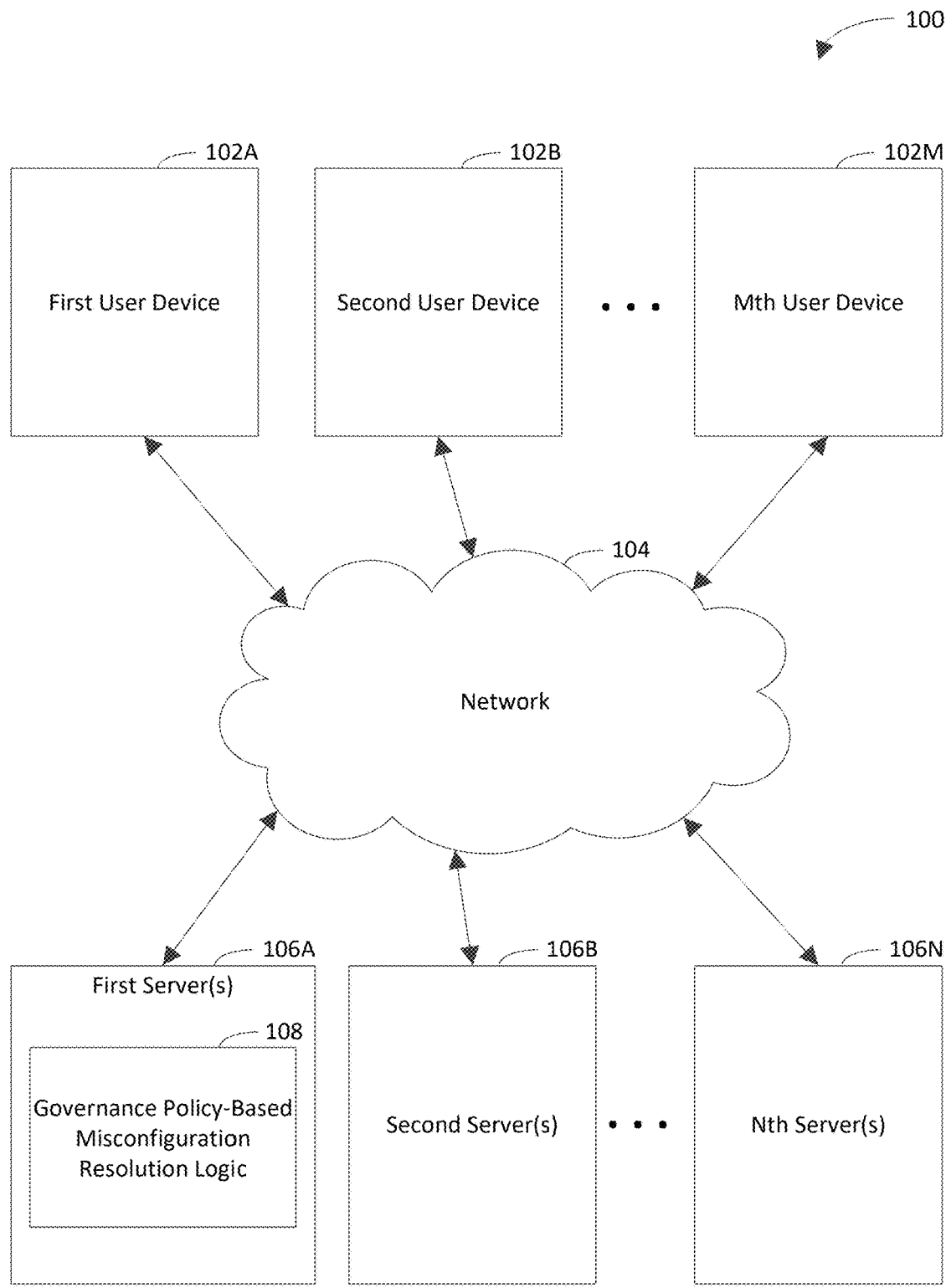
FIG. 1 is a block diagram of an example governance policy-based misconfiguration resolution system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

A recent trend has been to shift (a.k.a. "shift-left") responsibility for security of cloud native applications from security teams to development and operations teams, which are referred to collectively as "DevOps." However, DevOps often is unable to adequately address the number of security vulnerabilities that are discovered in a cloud native application, which increases the susceptibility of the cloud native application to malicious attacks.

It may be desirable to automatically increase security of a cloud native application by reducing a number of security vulnerabilities in the cloud native application. For instance, misconfigurations of the native application may be identified, and configuration changes may be automatically implemented in the cloud native application to resolve the misconfigurations. Examples of a misconfiguration include but are not limited to a permission or functionality that is no longer necessary to achieve its intended purpose, a permission or functionality that was inadvertently created, and a permission or functionality that was maliciously created (i.e., created by a malicious entity). Any of a variety of factors may be used to determine whether to implement the configuration changes. For example, the configuration changes may be categorized among multiple categories based on (e.g., based at least on) negative consequences that the configuration changes are capable of causing, likelihoods that the configuration changes will cause the negative consequences, and so on. Examples of a negative consequence include but are not limited to productivity of a user (e.g., developer or an end user) of the cloud native application being reduced, access of a user to the cloud native application (or a version thereof) being compromised, and security of the cloud native application being reduced. A determination whether to implement a configuration change may be based on a category in which the configuration change is categorized, an amount of time since a security misconfiguration that the configuration change is configured to resolve has been used, and so on. Governance policies may be generated to control whether and/or under what conditions a misconfiguration, which is resolved by implementing a corresponding configuration change, is allowed to occur in the future.

Example embodiments described herein are capable of providing automated governance policy-based security for a cloud native application. For instance, the example embodiments may resolve recently unused security misconfigurations of the cloud native application using categorization and one or more governance policies. In a first example embodiment, first configuration changes, which are included in a plurality of configuration changes that are configured to resolve a plurality of security misconfigurations of a cloud native application, are categorized into a first category. Categorization of the first configuration changes is based at least on (e.g., as a result of or in response to) the first configuration changes being capable of reducing productivity of a user of the cloud native application who has uncompromised access to the cloud native application. The categorization of the first configuration changes is further based at least on the first configuration changes having a likelihood of reducing security of the cloud native application that is greater than or equal to a likelihood threshold. Second configuration changes, which are included in the plurality of configuration changes, are categorized into a second category as a result of the second configuration changes being capable of compromising access of an end user to a version of the cloud native application. A plurality of recently unused security misconfigurations are identified in the plurality of security misconfigurations as a result of the plurality of recently unused security misconfigurations being unused for at least a designated duration of time that ends at a current time. The first configuration changes, which resolve first recently unused security misconfigurations in the plurality of recently unused security misconfigurations, are automatically implemented. The second configuration changes, which resolve second recently unused security misconfigurations in the plurality of recently unused security misconfigurations, are automatically implemented. Governance policies are automatically generated. The governance policies define security actions to perform with regard to future attempts to implement the second recently unused security misconfigurations.

In a second example embodiment, a plurality of recently unused security misconfigurations are identified in a plurality of security misconfigurations of a cloud native application as a result of the plurality of recently unused security misconfigurations being unused for at least a designated duration of time that ends at a current time. A first configuration change that resolves a first recently unused security misconfiguration in the plurality of recently unused security misconfigurations is automatically implemented. Automatic implementation of the first configuration change is based at least on (e.g., as a result of or in response to) the first configuration change being capable of reducing productivity of a user of the cloud native application who has uncompromised access to the cloud native application. The automatic implementation of the first configuration change is further based at least on the first configuration change having a likelihood of reducing security of the cloud native application that is greater than or equal to a likelihood threshold. A second configuration change that resolves a second recently unused security misconfiguration in the plurality of recently unused security misconfigurations is automatically implemented as a result of the second configuration change being capable of compromising access of an end user to a version of the cloud native application. A governance policy is automatically generated as the result of the second configuration change being capable of compromising access of the end user to the version of the cloud native application. The governance policy defines a security action to perform with regard to a future attempt to implement the second recently unused security misconfiguration.

Example techniques described herein have a variety of benefits as compared to conventional techniques for managing security of a cloud native application. For instance, the example techniques are capable of automating at least some aspects of managing the security of the cloud native application. The example techniques are capable of automating management of security vulnerabilities in the cloud native application, for example, by automatically reducing a number of the security vulnerabilities. The number of the security vulnerabilities may be reduced by identifying misconfigurations of the native application and automatically implementing configuration changes in the cloud native application that resolve the misconfigurations. The configuration changes may be conditionally implemented based on the configuration changes satisfying one or more criteria and/or the misconfigurations, which the configuration changes are configured to resolve, satisfying one or more criteria. By conditionally implementing the configuration changes, security and/or reliability of the cloud native application may be increased. For instance, a number or magnitude of negative consequences that result from implementing configuration changes to resolve misconfigurations of the cloud native application may be reduced.

The example techniques are capable of increasing security of a computing system that executes the cloud native application and/or resources that are accessible using the cloud native application. For instance, the example techniques may reduce a number of misconfigurations of the cloud native application, which may reduce a likelihood of a malicious entity to exploit such a misconfiguration to gain access to a resource of the computing system and/or a resource that is accessible using the cloud native application.

By identifying misconfigurations of a native application and automatically implementing configuration changes in the cloud native application that resolve the misconfigurations (e.g., based on satisfaction of one or more criteria), the example techniques may increase a user experience of a user (e.g., an end user, a developer, or an information technology (IT) professional who is tasked with managing security of the cloud native application). The example techniques may increase an efficiency of the user by reducing the amount of time that the user otherwise would have consumed to reduce the number of security vulnerabilities in the cloud native application.

The example techniques may reduce an amount of time and/or resources (e.g., processor cycles, memory, network bandwidth) that is consumed by a computing system to manage security of a cloud native application (e.g., by reducing a number of security vulnerabilities in the cloud native application).

For example, by categorizing first configuration changes, which are included in a plurality of configuration changes that are configured to resolve a plurality of security misconfigurations of a cloud native application, into a first category based at least on the first configuration changes being capable of reducing productivity of a user of the cloud native application who has uncompromised access to the cloud native application and further based at least on the first configuration changes having a likelihood of reducing security of the cloud native application that is greater than or equal to a likelihood threshold; categorizing second configuration changes, which are included in the plurality of configuration changes, into a second category as a result of the second configuration changes being capable of compromising access of an end user to a version of the cloud native application; identifying a plurality of recently unused security misconfigurations in the plurality of security misconfigurations as a result of the plurality of recently unused security misconfigurations being unused for at least a designated duration of time that ends at a current time; automatically implementing the first configuration changes that resolve first recently unused security misconfigurations in the plurality of recently unused security misconfigurations; automatically implementing the second configuration changes that resolve second recently unused security misconfigurations in the plurality of recently unused security misconfigurations; and/or automatically generating governance policies, which define security actions to perform with regard to future attempts to implement the second recently unused security misconfigurations, the amount of time and resources that otherwise would have been consumed to perform such tasks manually (e.g., based on instructions received from a user) may be avoided.

In another example, by identifying a plurality of recently unused security misconfigurations in a plurality of security misconfigurations of a cloud native application as a result of the plurality of recently unused security misconfigurations being unused for at least a designated duration of time that ends at a current time; automatically implementing a first configuration change that resolves a first recently unused security misconfiguration in the plurality of recently unused security misconfigurations based at least on the first configuration change being capable of reducing productivity of a user of the cloud native application who has uncompromised access to the cloud native application and further based at least on the first configuration change having a likelihood of reducing security of the cloud native application that is greater than or equal to a likelihood threshold; automatically implementing a second configuration change that resolves a second recently unused security misconfiguration in the plurality of recently unused security misconfigurations as a result of the second configuration change being capable of compromising access of an end user to a version of the cloud native application; and/or automatically generating a governance policy, which defines a security action to perform with regard to a future attempt to implement the second recently unused security misconfiguration, as the result of the second configuration change being capable of compromising access of the end user to the version of the cloud native application, the amount of time and resources that otherwise would have been consumed to perform such tasks manually (e.g., based on instructions received from a user) may be avoided.

Automating any of the tasks mentioned in the examples above may reduce a cost associated with managing the security of the cloud native application. For instance, the cost of protecting a computing system that executes the cloud native application (including data stored on the computing system) and resources that are accessible using the cloud native application from a malicious attack may be reduced. By reducing the amount of time and/or resources that is consumed by the computing system, the efficiency of the computing system may be increased.

FIG. 1 is a block diagram of an example governance policy-based misconfiguration resolution system 100 in accordance with an embodiment. Generally speaking, the governance policy-based misconfiguration resolution system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the governance policy-based misconfiguration resolution system 100 provides automated governance policy-based security for a cloud native application. For instance, the governance policy-based misconfiguration resolution system 100 may resolve recently unused security misconfigurations of the cloud native application using categorization and one or more governance policies. Detail regarding techniques for providing automated governance policy-based security for a cloud native application is provided in the following discussion.

As shown in FIG. 1, the governance policy-based misconfiguration resolution system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the complex expression-based metadata generation system 100.

One example type of computer program that may be executed by one or more of the servers 106A-106N is a computer security program. A computer security program is a computer program that provides security with regard to information and/or communications associated with a computing system. For instance, the information associated with the computing system may include information stored on the computing system and/or information accessed (e.g., read) by the computing system. The communications associated with the computing system may include communications received by the computing system and/or communications provided (e.g., transmitted) by the computing system. An example of a communication is an electronic message. Examples of a computer security program include Bitdefender® security program, developed and distributed by Bitdefender IPR Management Ltd.; Norton® security program, developed and distributed by Gen Digital Inc.; Avast® security program, developed and distributed by Avast Software S.R.O.; McAfee® security program, developed and distributed by McAfee, LLC; and Microsoft Defender® security program, developed and distributed by Microsoft Corporation. It will be recognized that the example techniques described herein may be implemented using a computer security program. For instance, a software product (e.g., a subscription service, a non-subscription service, or a combination thereof) may include the computer security program, and the software product may be configured to perform the example techniques, though the scope of the example embodiments is not limited in this respect.

The computer security program may be a cloud native application protection platform (CNAPP). A CNAPP is an all-in-one platform that unifies security and compliance capabilities to prevent, detect, and respond to cloud security threats. A CNAPP integrates multiple cloud security solutions, which traditionally have been siloed, into a common (e.g., single) user interface. The cloud security solutions may include cloud security posture management (CSPM), multipipeline DevOps security, a cloud workload protection platform (CWPP), cloud infrastructure entitlement management (CIEM), and cloud service network security (CSNS). CSPM provides a connected, prioritized view of potential vulnerabilities and misconfigurations across multi-cloud and hybrid environments. The CSPM continuously assesses overall security posture of a system and provides automated alerts and recommendations about critical issues that could expose the system to data breaches. The CSPM may include automated compliance management and remediation tools to identify and remedy compliance deficiencies. Multipipeline DevOps security provides a central console that enables management of DevOps security across multiple (e.g., all) pipelines. For instance, the multipipeline DevOps security may be used to reduce cloud misconfigurations and to scan new code to keep vulnerabilities therein from reaching a production environment. The multipipeline DevOps security may include infrastructure-as-code scanning tools that analyze configuration files from the earliest stages of development to confirm that new configuration files are compliant with security policies. A CWPP provides real-time detection and response to threats based on up-to-date information regarding multi-cloud workloads (e.g., virtual machines, containers, Kubernetes, databases, storage accounts, network layers, and app services). The CWPP may enable a quick investigation into threats and reduce the attack surface of a system. CIEM centralizes permissions management across a cloud and hybrid footprint, which inhibits (e.g., prevents) accidental or malicious misuse of permissions. CSNS complements the CWPP by protecting cloud infrastructure in real time. The CSNS may include any of a variety of security tools, including but not limited to distributed denial-of-service protection, web application firewalls, transport layer security examination, and load balancing.

A computer security program may be incorporated into a cloud computing program (a.k.a. a cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to a Google Cloud® program developed and distributed by Google Inc.; an Oracle Cloud® program developed and distributed by Oracle Corporation; an Amazon Web Services® program developed and distributed by Amazon.com, Inc.; a Salesforce® program developed and distributed by Salesforce.com, Inc.; an AppSource® program developed and distributed by Microsoft Corporation; an Azure® program developed and distributed by Microsoft Corporation; a GoDaddy® program developed and distributed by GoDaddy.com LLC; and a Rackspace® program developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include governance policy-based misconfiguration resolution logic 108 for illustrative purposes. The governance policy-based misconfiguration resolution logic 108 is configured to provide automated governance policy-based security for a cloud native application. In an example implementation, the governance policy-based misconfiguration resolution logic 108 categorizes first configuration changes, which are included in a plurality of configuration changes that are configured to resolve a plurality of security misconfigurations of a cloud native application, into a first category. Categorization of the first configuration changes is based at least on (e.g., as a result of or in response to) the first configuration changes being capable of reducing productivity of a user of the cloud native application who has uncompromised access to the cloud native application. The categorization of the first configuration changes is further based at least on the first configuration changes having a likelihood of reducing security of the cloud native application that is greater than or equal to a likelihood threshold. The governance policy-based misconfiguration resolution logic 108 categorizes second configuration changes, which are included in the plurality of configuration changes, into a second category as a result of the second configuration changes being capable of compromising access of an end user to a version of the cloud native application. The governance policy-based misconfiguration resolution logic 108 identify a plurality of recently unused security misconfigurations in the plurality of security misconfigurations as a result of the plurality of recently unused security misconfigurations being unused for at least a designated duration of time that ends at a current time. The governance policy-based misconfiguration resolution logic 108 automatically implement the first configuration changes that resolve first recently unused security misconfigurations in the plurality of recently unused security misconfigurations. The governance policy-based misconfiguration resolution logic 108 automatically implement the second configuration changes that resolve second recently unused security misconfigurations in the plurality of recently unused security misconfigurations. The governance policy-based misconfiguration resolution logic 108 automatically generate governance policies, which define security actions to perform with regard to future attempts to implement the second recently unused security misconfigurations.

In another example implementation, the governance policy-based misconfiguration resolution logic 108 identifies a plurality of recently unused security misconfigurations in a plurality of security misconfigurations of a cloud native application as a result of the plurality of recently unused security misconfigurations being unused for at least a designated duration of time that ends at a current time. The governance policy-based misconfiguration resolution logic 108 automatically implements a first configuration change that resolves a first recently unused security misconfiguration in the plurality of recently unused security misconfigurations. Automatic implementation of the first configuration change is based at least on (e.g., as a result of or in response to) the first configuration change being capable of reducing productivity of a user of the cloud native application who has uncompromised access to the cloud native application. The automatic implementation of the first configuration change is further based at least on the first configuration change having a likelihood of reducing security of the cloud native application that is greater than or equal to a likelihood threshold. The governance policy-based misconfiguration resolution logic 108 automatically implements a second configuration change that resolves a second recently unused security misconfiguration in the plurality of recently unused security misconfigurations as a result of the second configuration change being capable of compromising access of an end user to a version of the cloud native application. The governance policy-based misconfiguration resolution logic 108 automatically generates a governance policy, which defines a security action to perform with regard to a future attempt to implement the second recently unused security misconfiguration, as the result of the second configuration change being capable of compromising access of the end user to the version of the cloud native application.

The governance policy-based misconfiguration resolution logic 108 may be implemented in various ways to provide automated governance policy-based security for a cloud native application, including being implemented in hardware, software, firmware, or any combination thereof. For example, the governance policy-based misconfiguration resolution logic 108 may be implemented as computer program code configured to be executed in one or more processors. In another example, at least a portion of the governance policy-based misconfiguration resolution logic 108 may be implemented as hardware logic/electrical circuitry. For instance, at least a portion of the governance policy-based misconfiguration resolution logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the governance policy-based misconfiguration resolution logic 108 may be (or may be included in) a computer security program and/or a cloud computing program, though the scope of the example embodiments is not limited in this respect.

The governance policy-based misconfiguration resolution logic 108 is shown to be incorporated in the first server(s) 106A for illustrative purposes and is not intended to be limiting. It will be recognized that the governance policy-based misconfiguration resolution logic 108 (or any portion(s) thereof) may be incorporated in any one or more of the servers 106A-106N, any one or more of the user devices 102A-102M, or any combination thereof. For example, client-side aspects of the governance policy-based misconfiguration resolution logic 108 may be incorporated in one or more of the user devices 102A-102M, and server-side aspects of governance policy-based misconfiguration resolution logic 108 may be incorporated in one or more of the servers 106A-106N.

Figure 2:
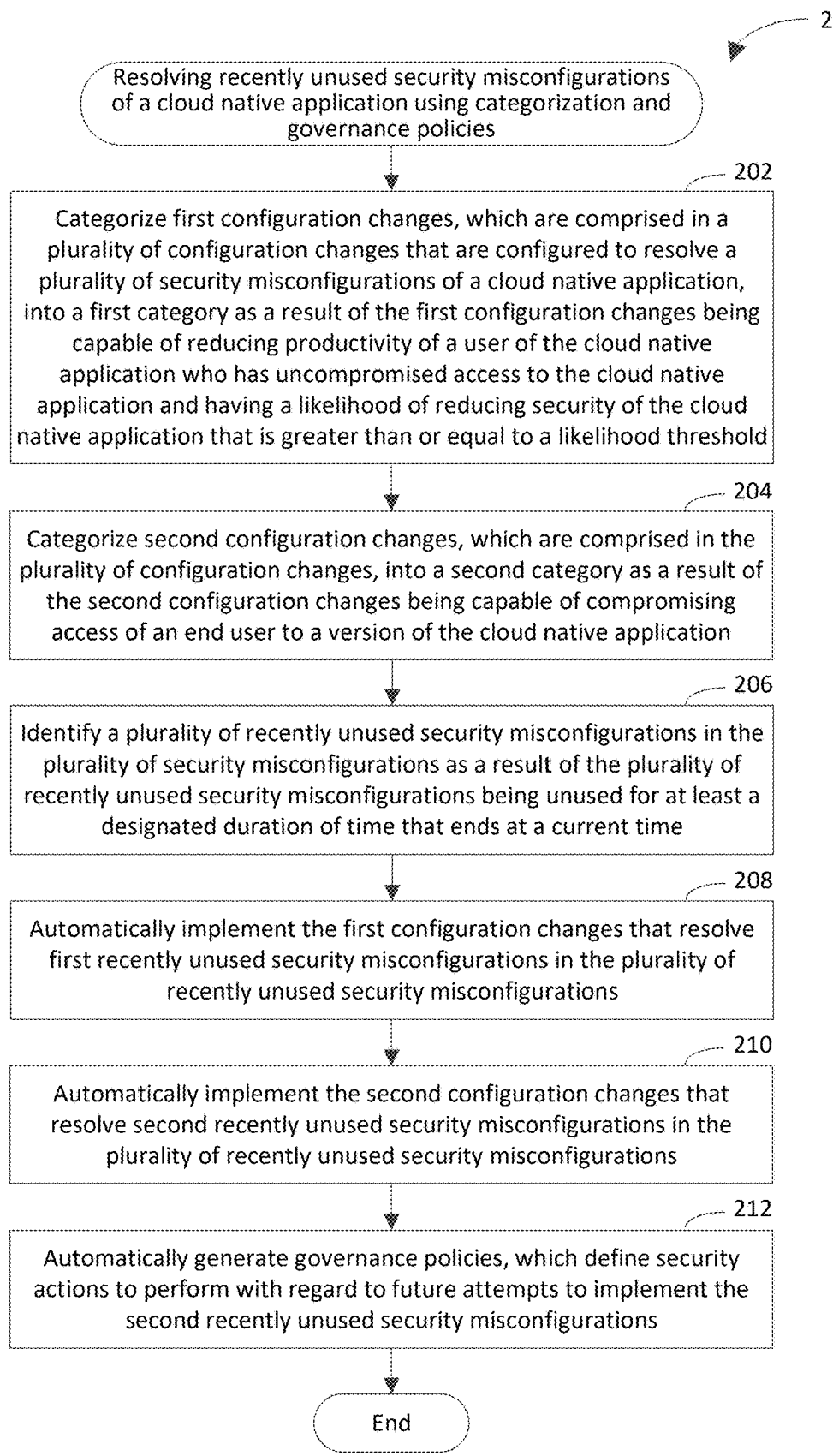
FIG. 2 depicts a flowchart of an example method for resolving recently unused security misconfigurations of a cloud native application using categorization and governance policies in accordance with an embodiment.
Figure 3:
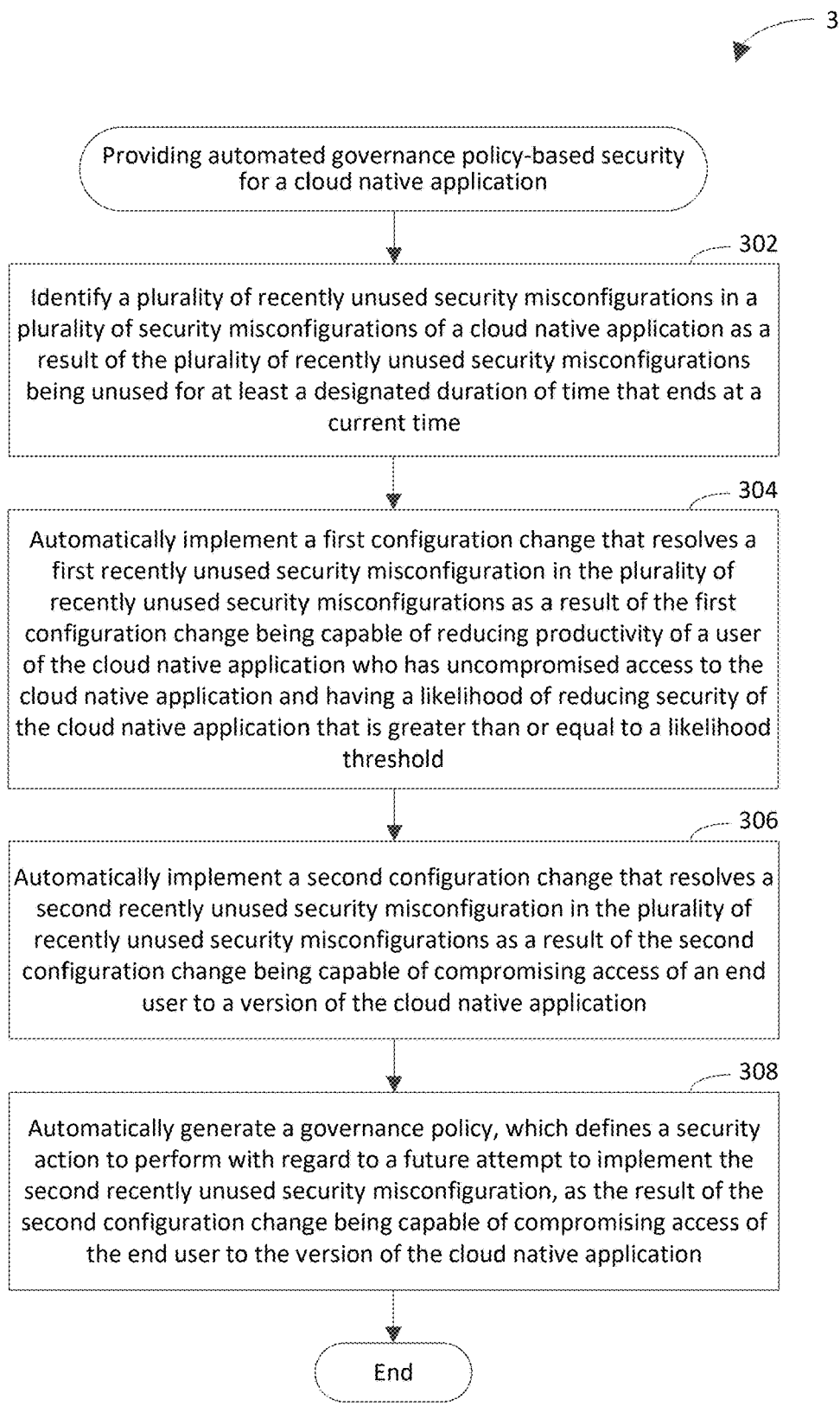
FIG. 3 depicts a flowchart of an example method for providing automated governance policy-based security for a cloud native application in accordance with an embodiment.
Figure 4:
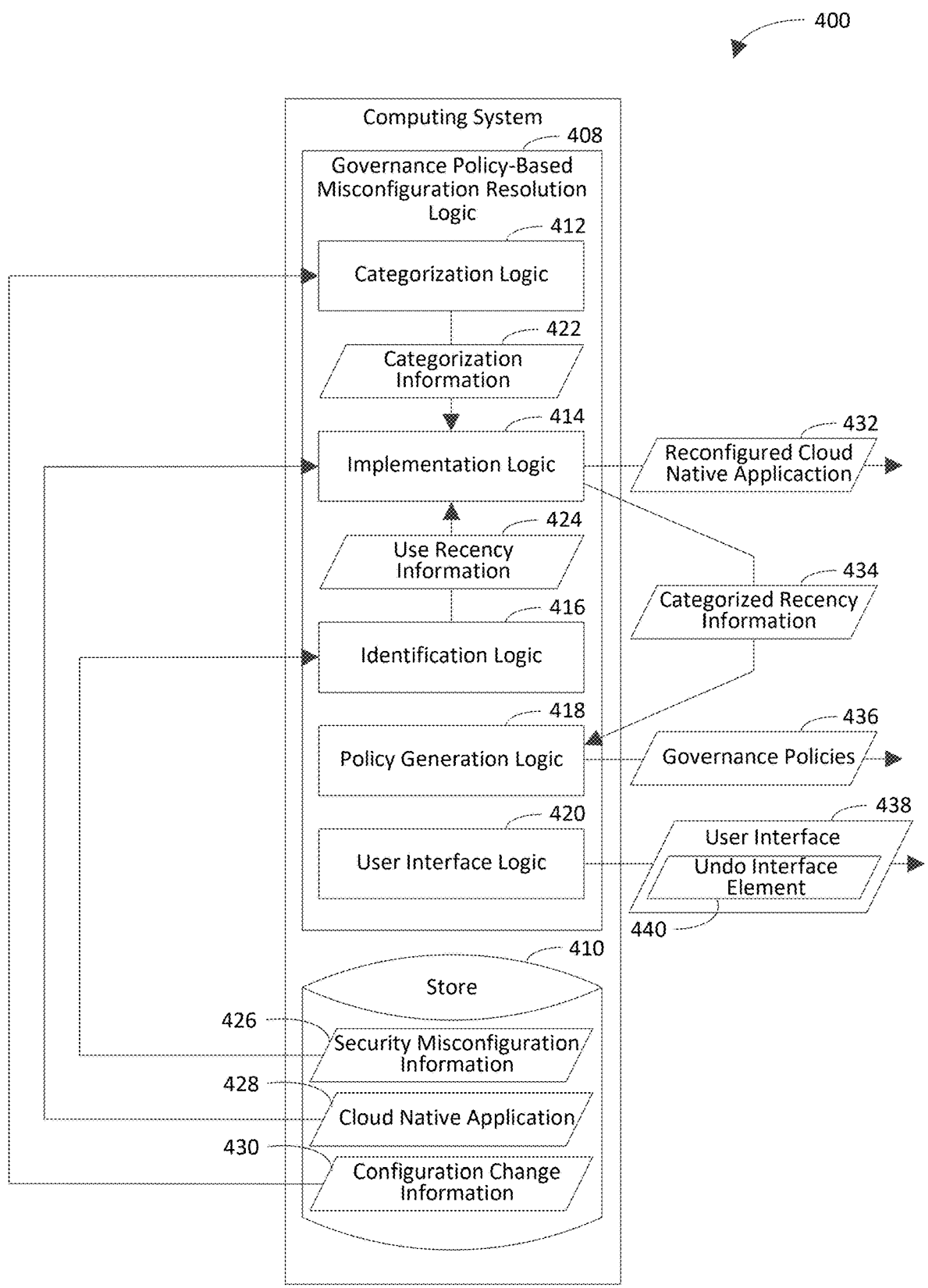
FIG. 4 is a block diagram of an example computing system in accordance with an embodiment.

FIG. 2 depicts a flowchart 200 of an example method for resolving recently unused security misconfigurations of a cloud native application using categorization and governance policies in accordance with an embodiment. FIG. 3 depicts a flowchart 300 of an example method for providing automated governance policy-based security for a cloud native application in accordance with an embodiment. Flowcharts 200 and 300 may be performed by the first server(s) 106A shown in FIG. 1, for example. For illustrative purposes, flowcharts 200 and 300 are described with respect to a computing system 400 shown in FIG. 4, which is an example implementation of the first server(s) 106A. As shown in FIG. 4, the computing system 400 includes governance policy-based misconfiguration resolution logic 408 and a store 410. The governance policy-based misconfiguration resolution logic 408 includes categorization logic 412, implementation logic 414, identification logic 416, policy generation logic 418, and user interface logic 420. The store 410 may be any suitable type of store. One type of store is a database. For instance, the store 410 may be a relational database, an entity-relationship database, an object database, an object relational database, an extensible markup language (XML) database, etc. The store 410 is shown to store security misconfiguration information 426, a cloud native application 428, and configuration change information 430 for non-limiting, illustrative purposes. Further structural and operational embodiments will be apparent to persons skilled in the relevant art(s) based on the discussion regarding flowcharts 200 and 300.

As shown in FIG. 2, the method of flowchart 200 begins at step 202. In step 202, first configuration changes, which are included in a plurality of configuration changes that are configured to resolve a plurality of security misconfigurations of a cloud native application, are categorized into a first category. The first configuration changes are categorized into the first category as a result of the first configuration changes being capable of reducing productivity of a user of the cloud native application who has uncompromised (e.g., blocked or delayed) access to the cloud native application and having a likelihood of reducing security of the cloud native application that is greater than or equal to a likelihood threshold.

In an example implementation, the categorization logic 412 categorizes the first configuration changes into the first category as a result of the first configuration changes being capable of reducing productivity of a user of the cloud native application 428 who has uncompromised access to the cloud native application 428 and having a likelihood of reducing security of the cloud native application 428 that is greater than or equal to a likelihood threshold. In accordance with this implementation, the categorization logic 412 analyzes the configuration change information 430 to identify the plurality of configuration changes and to determine that the plurality of configuration changes are configured to resolve the plurality of security misconfigurations of the cloud native application 428. For instance, the configuration change information 430 may cross-reference the plurality of configuration changes with the plurality of respective security misconfigurations. In an aspect, the categorization logic 412 analyzes the plurality of configuration changes to determine which of the plurality of configuration changes satisfies a first criterion, namely being capable of reducing the productivity of a user of the cloud native application 428 who has uncompromised access to the cloud native application 428, and to further determine which of the plurality of configuration changes satisfies a second criterion, namely having a likelihood of reducing the security of the cloud native application 428 that is greater than or equal to the likelihood threshold. In accordance with this aspect, the categorization logic 412 selects the first configuration changes from the plurality of configuration changes based on (e.g., based at least on) the first configuration changes satisfying the first criterion and the second criterion. In further accordance with this aspect, the categorization logic 412 categorizes the first configuration changes into the first category. The categorization logic 412 generates categorization information 422 to identify the first configuration changes and to indicate that the first configuration changes are categorized into the first category. In an aspect, the categorization information 422 cross-references the first configuration changes with the respective security misconfigurations that the first configuration changes are configured to resolve.

At step 204, second configuration changes, which are included in the plurality of configuration changes, are categorized into a second category as a result of the second configuration changes being capable of compromising access of an end user to a version of the cloud native application. In an example implementation, the categorization logic 412 categorizes the second configuration changes into the second category as a result of the second configuration changes being capable of compromising access of an end user to a version of the cloud native application 428. In an aspect, the categorization logic 412 analyzes the plurality of configuration changes that are identified in the configuration change information 430 to determine which of the plurality of configuration changes satisfies a third criterion, namely being capable of compromising access of an end user to a version of the cloud native application 428. In accordance with this aspect, the categorization logic 412 selects the second configuration changes from the plurality of configuration changes based on the second configuration changes satisfying the third criterion. In further accordance with this aspect, the categorization logic 412 categorizes the second configuration changes into the second category. The categorization logic 412 configures the categorization information to identify the second configuration changes and to indicate that the second configuration changes are categorized into the second category. In an aspect, the categorization information 422 cross-references the second configuration changes with the respective security misconfigurations that the second configuration changes are configured to resolve.

The categorization logic 412 may use artificial intelligence (AI) to perform at least some of its operations. For instance, the categorization logic 412 may use the machine learning to analyze (e.g., develop and/or refine an interpretation of) the plurality of configuration changes, the plurality of security misconfigurations, potential impacts of the configuration changes (e.g., capability of reducing productivity of a user of the cloud native application, likelihood of reducing security of the cloud native application, and capability of compromising access of an end user to a version of the cloud native application), the cloud native application, relationships between any of the foregoing factors, and confidences in those relationships. For example, the categorization logic 412 may compare attributes of the aforementioned factors and contextual information (which may include sample configuration changes, sample security misconfigurations, sample potential impacts of the sample configuration changes, and/or sample cloud native applications) using artificial intelligence to categorize the first configuration changes at step 202 and to categorize the second configuration changes at step 204.

In some example embodiments, the categorization logic 412 includes a neural network that uses the artificial intelligence to determine (e.g., predict) relationships between the aforementioned factors and the contextual information and confidences in the relationships. The neural network uses those relationships to categorize the first configuration changes and the second configuration changes. For example, attributes of the aforementioned factors and the contextual information (which may include example configuration changes, example security misconfigurations, example potential impacts of the example configuration changes, and/or example cloud native applications) may be compared to determine similarities and differences between those attributes. In accordance with this example, the neural network may use those similarities and differences to categorize the first configuration changes and the second configuration changes.

Examples of a neural network include but are not limited to a feed forward neural network and a transformer-based neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the categorization logic 412 employs a feed forward neural network to train an AI model that is used to determine AI-based confidences. Such AI-based confidences may be used to determine likelihoods that events will occur.

A transformer-based neural network is a neural network that incorporates a transformer. A transformer is a deep learning model that utilizes attention to differentially weight the significance of each portion of sequential input data, such as natural language. Attention is a technique that mimics cognitive attention. Cognitive attention is a behavioral and cognitive process of selectively concentrating on a discrete aspect of information while ignoring other perceivable aspects of the information. Accordingly, the transformer uses the attention to enhance some portions of the input data while diminishing other portions. The transformer determines which portions of the input data to enhance and which portions of the input data to diminish based on the context of each portion. For instance, the transformer may be trained to identify the context of each portion using any suitable technique, such as gradient descent.

In an example embodiment, the transformer-based neural network generates an categorization model (e.g., to categorize configuration changes) by utilizing information, such as the configuration changes indicated by the configuration change information 430, the security misconfigurations indicated by the security misconfiguration information 426, the potential impacts of the configuration changes, the cloud native application 428, relationships between any of the foregoing, and AI-based confidences that are derived therefrom.

In some example embodiments, the categorization logic 412 includes training logic and inference logic. The training logic is configured to train an AI algorithm that the inference logic uses to determine (e.g., infer) the AI-based confidences. For instance, the training logic may provide sample configuration changes, sample security misconfigurations, sample potential impacts of the sample configuration changes, and/or sample cloud native applications as inputs to the AI algorithm to train the AI algorithm. The sample data may be labeled. The AI algorithm may be configured to derive relationships between the features (e.g., the configuration changes indicated by the configuration change information 430, the security misconfigurations indicated by the security misconfiguration information 426, the potential impacts of the configuration changes, and the cloud native application 428) and the resulting AI-based confidences. The inference logic is configured to utilize the AI algorithm, which is trained by the training logic, to determine the AI-based confidence when the features are provided as inputs to the algorithm.

In an example embodiment, the categorization logic 412 includes a generative language model. A generative language model is an AI model that is capable of generating original text output based on sample data. Examples of a generative language model include but are not limited to a generative pre-trained transformer 3 (a.k.a., GPT-3®) model and a generative pre-trained transformer 4 (a.k.a. GPT-4®) model, developed and distributed by OpenAI, Inc.; a large language model Meta AI (a.k.a. LLaMA®) model, developed and distributed by Meta Platforms Inc.; a language model for dialogue applications (a.k.a., LaMDA®) model, developed and distributed by Google LLC; and a BigScience large open-science open-access multilingual language model (a.k.a. BLOOM) model, developed and distributed by the BigScience collaborative initiative. A generative language model may use any suitable relevancy determination and/or ranking technique. For instance, the generative language model may use a BM25 (a.k.a. Okapi BM25) ranking function to perform its analysis (e.g., based on keywords).

In another example embodiment, the categorization logic 412 includes a large language model (LLM). A large language model is an artificial neural network that is capable of performing natural language processing (NLP) tasks. For instance, the large language model may use a transformer model to perform the NLP tasks. In an aspect, the large language model is trained (e.g., pre-trained) using self-supervised learning and semi-supervised learning. Examples of a large language model include but are not limited to the GPT-3® and GPT-4® models, developed and distributed by OpenAI, Inc.; the LLaMA® model, developed and distributed by Meta Platforms Inc.; and a pathways language model (a.k.a., PaLM®) model, developed and distributed by Google LLC.

In yet another example embodiment, the categorization logic 412 includes an embedding model. An embedding model is an AI model that uses deep learning to convert data into vectors, which represent attributes of the data, and that compares at least a subset of the vectors to determine an extent to which the vectors that are included in the subset are similar. For instance, each vector may represent a semantic meaning of a configuration change, a security misconfiguration, a potential impact of a configuration change, or at least a portion of a cloud native application.

In still another example embodiment, the categorization logic 412 includes multiple types of AI models. Weights may be applied to the responses generated by the respective types of AI models. For example, the categorization logic 412 may include a generative AI model and an embedding model. In accordance with this example, a first weight may be applied to a first response generated by the generative AI model to provide a first weighted response, and a second weight that is different from the first weight may be applied to a second response of the embedding model to provide a second weighted response. The categorization logic 412 may combine (e.g., sum) the first weighted response and the second weighted response to generate a response to an AI prompt.

At step 206, a plurality of recently unused security misconfigurations are identified in the plurality of security misconfigurations as a result of the plurality of recently unused security misconfigurations being unused for at least a designated duration of time that ends at a current time. The designated duration of time may be any suitable duration of time (e.g., seven days, thirty days, two months, or one year). In an example implementation, the identification logic 416 identifies the plurality of recently unused security misconfigurations in the plurality of security misconfigurations as a result of the plurality of recently unused security misconfigurations being unused for at least the designated duration of time that ends at the current time. In an aspect, the identification logic 416 analyzes security misconfiguration information 426 (which may include logs associated with the plurality of security misconfigurations) to identify a most recent time instance at which each of the plurality of security misconfigurations was used. In accordance with this aspect, the identification logic 416 compares a difference between the most recent time instance at which each of the plurality of security misconfigurations was used and the current time to calculate the duration of time for each of the plurality of security misconfigurations. In further accordance with this aspect, the identification logic 416 selects the plurality of recently unused security misconfigurations from the plurality of security misconfigurations based on the duration of time for each of the plurality of recently unused security misconfigurations being greater than or equal to the designated duration of time. The identification logic 416 generates use recency information 424 to identify the plurality of recently unused security misconfigurations. In an aspect, the use recency information 424 distinguishes the plurality of recently unused security misconfigurations from the other security misconfigurations in the plurality of security misconfigurations.

At step 208, the first configuration changes that resolve first recently unused security misconfigurations in the plurality of recently unused security misconfigurations are automatically implemented. In an aspect, automatically implementing a first configuration change includes revoking a permission (e.g., a read, write, or edit permission) of a user of the cloud native application with regard to a runtime resource (e.g., storage or an account) associated with the cloud native application, revoking access of the user to the runtime resource, or revoking a privilege of the user with regard to the runtime resource. Revoking access of the user to the runtime resource may include revoking public Internet access to the runtime resource (e.g., by requiring use of a specified virtual network private link to access the runtime resource). In another aspect, automatically implementing a first configuration change includes closing a network (e.g., a physical network or a virtual network) associated with the cloud native application.

In an example implementation, the implementation logic 414 automatically implements the first configuration changes that resolve first recently unused security misconfigurations in the plurality of recently unused security misconfigurations. In an aspect, the implementation logic 414 analyzes the categorization information 422 to identify the first configuration changes and the security misconfigurations that the first configuration changes are configured to resolve. In accordance with this aspect, the implementation logic 414 analyzes the use recency information 424 to identify the plurality of recently unused security misconfigurations. In further accordance with this aspect, the implementation logic 414 cross-references the security misconfigurations that the first configuration changes are configured to resolve, as indicated by the categorization information 422, with the plurality of recently unused security misconfigurations, which are identified in the use recency information 424, to determine which of the security misconfigurations that the first configuration changes are configured to resolve are included in the plurality of recently unused security misconfigurations. In further accordance with this aspect, the implementation logic 414 automatically implements the first configuration changes that resolve security misconfigurations found in the plurality of recently unused security misconfigurations in the cloud native application 428 to provide a reconfigured cloud native application 432.

In an example embodiment, automatically implementing the first configuration changes that resolve the first recently unused security misconfigurations at step 208 includes automatically revoking a personal access token (PAT) associated with the cloud native application. A personal access token is a string of characters (e.g., alphanumeric characters) that is capable of being used to authenticate a user who attempts to access a system (e.g., a computing system). For instance, the personal access token may be used in lieu of a password.

In another example embodiment, automatically implementing the first configuration changes that resolve the first recently unused security misconfigurations at step 208 includes automatically revoking a secure shell (SSH) key associated with the cloud native application. A secure shell key is a credential that is used (e.g., for authentication) in accordance with a secure shell protocol. The secure shell protocol is a cryptographic network protocol that facilitates operation of network services securely over an unsecured network. For instance, a system administrator may use a secure shell key to access, control, or modify a server over an unsecured network or to connect from a first virtual machine to a second virtual machine over the unsecured network.

In yet another example embodiment, automatically implementing the first configuration changes that resolve the first recently unused security misconfigurations at step 208 includes automatically implementing the first configuration changes that resolve the first recently unused security misconfigurations iteratively in successive development environments of a software development lifecycle. In an aspect, the development environments of the software development lifecycle are, in successive order, planning, analysis, design, development, testing, deployment, and maintenance. In the planning environment, a plan is established that defines functionalities that are to be incorporated into the cloud native application (e.g., based on business requirements). In the analysis environment, a strategy for implementing the functionalities is established. In the design environment, a determination is made how the cloud native program is to behave and appear to a user. In the development environment, the cloud native program is written. In the testing environment, the cloud native application is tested to determine how well the cloud native program meets defined goals in categories such as performance, load, security, and usability. In the deployment environment, the cloud native program is moved into a production environment in which the cloud native program is accessible to end users. In the maintenance environment, the cloud native program is monitored (e.g., on a continuous basis) to identify issues that arise in the production environment. It will be recognized that the first configuration changes that resolve the first recently unused security misconfigurations may be automatically implemented iteratively in fewer than all of the successive development environments of the software development lifecycle. For instance, the first configuration changes that resolve the first recently unused security misconfigurations may be automatically implemented iteratively in the development environment and the testing environment of the software development lifecycle.

In an aspect of this embodiment, automatically implementing the first configuration changes that resolve the first recently unused security misconfigurations at step 208 includes automatically implementing designated changes, which comprise the first configuration changes that resolve the first recently unused security misconfigurations, iteratively in the successive development environments (e.g., the development and the testing environment) of the software development lifecycle prior to deploying a version of the cloud native application that comprises the designated changes to production. For instance, the first configuration changes that resolve the first recently unused security misconfigurations may be automatically implemented iteratively in the development environment and the testing environment of the software development lifecycle prior to releasing the version of the cloud native application that comprises the designated changes to the deployment environment.

In still another example embodiment, the first recently unused security misconfigurations comprise a first recently unused security misconfiguration that grants a user individual access, rather than group access, to the cloud native application. In an aspect, the individual access is an access that is specific to the user. In another aspect, the group access is an access that is granted to a security group that includes a plurality of users, and the plurality of users includes the user.

At step 210, the second configuration changes that resolve second recently unused security misconfigurations in the plurality of recently unused security misconfigurations are automatically implemented. In an aspect, automatically implementing a second configuration change includes revoking a permission of a user of the cloud native application with regard to a runtime resource associated with the cloud native application, revoking access of the user to the runtime resource, or revoking a privilege of the user with regard to the runtime resource. In another aspect, automatically implementing a second configuration change includes closing a network associated with the cloud native application.

In an example implementation, the implementation logic 414 automatically implements the second configuration changes that resolve second recently unused security misconfigurations in the plurality of recently unused security misconfigurations. In an aspect, the implementation logic 414 analyzes the categorization information 422 to identify the second configuration changes and the security misconfigurations that the second configuration changes are configured to resolve. In accordance with this aspect, the implementation logic 414 analyzes the use recency information 424 to identify the plurality of recently unused security misconfigurations. In further accordance with this aspect, the implementation logic 414 cross-references the security misconfigurations that the second configuration changes are configured to resolve, as indicated by the categorization information 422, with the plurality of recently unused security misconfigurations, which are identified in the use recency information 424, to determine which of the security misconfigurations that the second configuration changes are configured to resolve are included in the plurality of recently unused security misconfigurations. In further accordance with this aspect, the implementation logic 414 automatically implements the second configuration changes that resolve security misconfigurations found in the plurality of recently unused security misconfigurations (e.g., in addition to the first configuration changes that resolve security misconfigurations found in the plurality of recently unused security misconfigurations) in the cloud native application 428 to provide the reconfigured cloud native application 432. The implementation logic 414 generates categorized recency information 434 to identify the second recently unused security misconfigurations.

In an example embodiment, automatically implementing the second configuration changes that resolve the second recently unused security misconfigurations at step 210 includes automatically revoking a service principal name (SPN) associated with the cloud native application. A service principal name is a unique identifier of a service instance. For instance, the SPN may be used for mutual authentication between a user and a service account. Kerberos authentication uses SPNs to associate a service instance with a service sign-in account, which enables a client application to request service authentication for an account even if the client does not have a name of the account.

In another example embodiment, automatically implementing the second configuration changes that resolve the second recently unused security misconfigurations at step 210 includes automatically revoking access to a control plane associated with (e.g., used to develop) the cloud native application. A control plane controls how a data plane behaves in a distributed system. Accordingly, the control plane controls how data (e.g., stored in packets) are sent (e.g., forwarded) between entities in the distributed system. The data plane sends the data between the entities.

In yet another example embodiment, automatically implementing the second configuration changes that resolve the second recently unused security misconfigurations at step 210 includes automatically revoking access to a machine identity that is used to control a number of nodes that are allocated to run instances of the cloud native application such that the number of nodes corresponds to an amount of incoming traffic that is directed to the cloud native application.

In still another example embodiment, automatically implementing the second configuration changes that resolve the second recently unused security misconfigurations at step 210 includes automatically revoking access to a database that is used by the cloud native application. In an aspect, the database is a structured query language (SQL) database.

In another example embodiment, automatically implementing the second configuration changes that resolve the second recently unused security misconfigurations at step 210 includes automatically revoking access to a secret in a key vault that is used by the cloud native application. In an aspect, automatically revoking access to the secret in the key vault includes automatically revoking access to an entirety of the key vault. In another aspect, the secret is used to encrypt a backup of the cloud native application.

In yet another example embodiment, the second configuration changes that resolve the second recently unused security misconfigurations are automatically implemented at step 210 iteratively in successive development environments of a software development lifecycle. In an aspect of this embodiment, automatically implementing the second configuration changes that resolve the second recently unused security misconfigurations at step 210 includes automatically implementing designated changes, which comprise the second configuration changes that resolve the second recently unused security misconfigurations, iteratively in the successive development environments of the software development lifecycle prior to deploying a version of the cloud native application that comprises the designated changes to production (i.e., to a production environment).

At step 212, governance policies are automatically generated. The governance policies define security actions to perform with regard to future attempts to implement the second recently unused security misconfigurations. In an example implementation, the policy generation logic 418 automatically generates governance policies 436, which define the security actions to perform with regard to the future attempts to implement the second recently unused security misconfigurations. In an aspect, the policy generation logic 418 analyzes the categorized recency information 434 to identify the second recently unused security misconfigurations.

In an example embodiment, automatically generating the governance policies at step 212 includes automatically generating a governance policy, which defines a security action that comprises generating a security alert that notifies an information technology (IT) professional about an attempt to implement a second recently unused security misconfiguration in the plurality of recently unused security misconfigurations. For instance, the security alert may include an inquiry as to whether the second recently unused security misconfiguration is needed.

In another example embodiment, automatically generating the governance policies at step 212 includes automatically generating a governance policy, which defines a security action that comprises ignoring an attempt to implement a second recently unused security misconfiguration in the plurality of recently unused security misconfigurations.

In yet another example embodiment, automatically generating the governance policies at step 212 includes automatically generating a governance policy, which defines a security action that comprises issuing an error in response to an attempt to implement a second recently unused security misconfiguration in the plurality of recently unused security misconfigurations. The error indicates that implementation of the second recently unused security misconfiguration is disallowed.

In still another example embodiment, the governance policies are automatically generated at step 212 prior to deployment of a version of the cloud native application that comprises the second recently unused security misconfigurations in a cloud environment.

In another example embodiment, automatically implementing the first configuration changes that resolve the first recently unused security misconfigurations at step 208 and automatically implementing the second configuration changes that resolve the second recently unused security misconfigurations at step 210 are performed prior to deployment of a version of the cloud native application that comprises the first recently unused security misconfigurations and the second recently unused security misconfigurations in a cloud environment.

In some example embodiments, one or more steps 202, 204, 206, 208, 210, and/or 212 of flowchart 200 may not be performed. Moreover, steps in addition to or in lieu of steps 202, 204, 206, 208, 210, and/or 212 may be performed. For instance, in an example embodiment, the method of flowchart 200 further includes automatically generating other governance policies, which define security actions to perform with regard to future attempts to implement the first recently unused security misconfigurations. For example, the other governance policies may include a governance policy indicating that port 22 of a machine (e.g., a physical machine or a virtual machine) is to be open. In another example, the other governance policies may include a governance policy indicating that access for SSH is to be revoked after a specified period of time (e.g., 3 hours or 7 hours). In an example implementation, the policy generation logic 418 automatically generates the other governance policies, which define the security actions to perform with regard to the future attempts to implement the first recently unused security misconfigurations. In an aspect, the policy generation logic 418 analyzes the categorized recency information 434 to identify the first recently unused security misconfigurations.

In another example embodiment, the method of flowchart 200 further includes generating a user interface that enables a user to undo an implementation of a first configuration change that resolves a first recently unused security misconfigurations in the plurality of recently unused security misconfigurations and/or an implementation of a second configuration change that resolves a second recently unused security misconfigurations in the plurality of recently unused security misconfigurations. In an example implementation, the user interface logic 420 generates a user interface 438 that includes an undo interface element 440, which enables the user to undo the implementation of the first configuration change that resolves the first recently unused security misconfigurations in the plurality of recently unused security misconfigurations and/or the implementation of the second configuration change that resolves the second recently unused security misconfigurations in the plurality of recently unused security misconfigurations.

As shown in FIG. 3, the method of flowchart 300 begins at step 302. In step 302, a plurality of recently unused security misconfigurations are identified in a plurality of security misconfigurations of a cloud native application as a result of the plurality of recently unused security misconfigurations being unused for at least a designated duration of time that ends at a current time. In an example implementation, the identification logic 416 identifies the plurality of recently unused security misconfigurations in the plurality of security misconfigurations of the cloud native application 428 as a result of the plurality of recently unused security misconfigurations being unused for at least the designated duration of time that ends at the current time. In an aspect, the identification logic 416 analyzes the security misconfiguration information 426 to identify the plurality of security misconfigurations and the amount of time that has passed since each of the plurality of security misconfigurations was most recently used. In accordance with this aspect, the identification logic 416 compares the amount of time that has passed since each of the plurality of security misconfigurations was most recently used and the designated duration of time to identify the plurality of recently unused security misconfigurations. In further accordance with this aspect, the plurality of recently unused security misconfigurations consists of each of the security misconfigurations for which the amount of time that has passed since the respective security misconfiguration was most recently used is greater than or equal to the designated duration of time. The identification logic 416 generates use recency information 424 to indicate (e.g., identify) the plurality of recently unused security misconfigurations.

At step 304, a first configuration change that resolves a first recently unused security misconfiguration in the plurality of recently unused security misconfigurations is automatically implemented. The first configuration change is automatically implemented as a result of the first configuration change being capable of reducing productivity of a user of the cloud native application who has uncompromised access to the cloud native application and having a likelihood of reducing security of the cloud native application that is greater than or equal to a likelihood threshold. In an aspect, the first configuration change is automatically implemented further as the result of the first recently unused security misconfiguration being unused for at least the designated duration of time that ends at the current time. In an example implementation, the implementation logic 414 automatically implements the first configuration change as a result of the first configuration change being capable of reducing productivity of the user of the cloud native application 428 who has uncompromised access to the cloud native application 428 and having a likelihood of reducing security of the cloud native application 428 that is greater than or equal to the likelihood threshold. For instance, the implementation logic 414 may automatically implement the first configuration change in the cloud native application 428 to provide a reconfigured cloud native application 432. In an aspect, the implementation logic 414 determines that the first configuration change is capable of reducing the productivity of the user of the cloud native application 428 who has uncompromised access to the cloud native application 428 and has a likelihood of reducing the security of the cloud native application 428 that is greater than or equal to the likelihood threshold by analyzing categorization information 422 received from the categorization logic 412. In another aspect, the implementation logic 414 analyzes the configuration change information 430 to identify a plurality of configuration changes and the plurality of security misconfigurations that the plurality of configuration changes are configured to resolve. For instance, the configuration change information 430 may cross-reference the plurality of configuration changes and the respective plurality of security misconfigurations. In accordance with this aspect, the implementation logic 414 analyzes the use recency information 424 to identify the plurality of recently unused security misconfigurations. In further accordance with this aspect, the implementation logic 414 identifies the first configuration change among the plurality of configuration changes identified in the configuration change information 430 and determines that the first configuration change is capable of reducing productivity of a user of the cloud native application 428 who has uncompromised access to the cloud native application 428 and has a likelihood of reducing security of the cloud native application 428 that is greater than or equal to the likelihood threshold (e.g., by analyzing the categorization information 422). In further accordance with this aspect, the implementation logic 414 cross-references the configuration change information 430 and the use recency information 424 to confirm that the security misconfiguration that the first configuration change is configured to resolve (i.e., the first recently unused security misconfiguration), as indicated by the configuration change information 430, is included in the plurality of recently unused security misconfigurations indicated by the use recency information 424. In further accordance with this aspect, the implementation logic 414 automatically implements the first configuration change as a result of confirming that the security misconfiguration that the first configuration change is configured to resolve is included in the plurality of recently unused security misconfigurations.

In an example embodiment, automatically implementing the first configuration change that resolves the first recently unused security misconfiguration at step 304 includes automatically revoking a personal access token associated with the cloud native application.

In another example embodiment, automatically implementing the first configuration change that resolves the first recently unused security misconfiguration at step 304 includes automatically revoking a secure shell key associated with the cloud native application.

In yet another example embodiment, automatically implementing the first configuration change that resolves the first recently unused security misconfiguration at step 304 includes automatically implementing the first configuration change that resolve the first recently unused security misconfiguration iteratively in successive development environments of a software development lifecycle. In an aspect of this embodiment, automatically implementing the first configuration change that resolves the first recently unused security misconfiguration at step 304 includes automatically implementing the first configuration change that resolve the first recently unused security misconfiguration iteratively in the successive development environments of the software development lifecycle prior to deploying a version of the cloud native application that comprises the first configuration change to production.

In still another example embodiment, the first recently unused security misconfiguration grants a user individual access, rather than group access, to the cloud native application.

At step 306, a second configuration change that resolves a second recently unused security misconfiguration in the plurality of recently unused security misconfigurations is automatically implemented as a result of the second configuration change being capable of compromising access of an end user to a version of the cloud native application. In an aspect, the second configuration change is automatically implemented further as the result of the second recently unused security misconfiguration being unused for at least the designated duration of time that ends at the current time. In an example implementation, the implementation logic 414 automatically implements the second configuration change as a result of the second configuration change being capable of compromising access of an end user to a version of the cloud native application 428. In an aspect, the implementation logic 414 determines that the second configuration change is capable of capable of compromising access of an end user to a version of the cloud native application 428 by analyzing the categorization information 422 received from the categorization logic 412. In another aspect, the implementation logic 414 identifies the second configuration change among the plurality of configuration changes identified in the configuration change information 430 and determines that the second configuration change is capable of compromising access of an end user to a version of the cloud native application 428 (e.g., by analyzing the categorization information 422). In accordance with this aspect, the implementation logic 414 cross-references the configuration change information 430 and the use recency information 424 to confirm that the security misconfiguration that the second configuration change is configured to resolve (i.e., the second recently unused security misconfiguration), as indicated by the configuration change information 430, is included in the plurality of recently unused security misconfigurations indicated by the use recency information 424. In further accordance with this aspect, the implementation logic 414 automatically implements the second configuration change as a result of confirming that the security misconfiguration that the second configuration change is configured to resolve is included in the plurality of recently unused security misconfigurations.

In an example embodiment, automatically implementing the second configuration change that resolves the second recently unused security misconfiguration at step 306 includes automatically revoking a service principal name associated with the cloud native application.

In another example embodiment, automatically implementing the second configuration change that resolves the second recently unused security misconfiguration at step 306 includes automatically revoking access to a control plane associated with the cloud native application.

In yet another example embodiment, automatically implementing the second configuration change that resolves the second recently unused security misconfiguration at step 306 includes automatically revoking access to a machine identity that is used to control a number of nodes that are allocated to run instances of the cloud native application such that the number of nodes corresponds to an amount of incoming traffic that is directed to the cloud native application.

In still another example embodiment, automatically implementing the second configuration change that resolves the second recently unused security misconfiguration at step 306 includes automatically revoking access to a database that is used by the cloud native application.

In another example embodiment, automatically implementing the second configuration change that resolves the second recently unused security misconfiguration at step 306 includes automatically revoking access to a secret in a key vault that is used by the cloud native application.

In yet another example embodiment, the second configuration change that resolves the second recently unused security misconfiguration is automatically implemented at step 306 iteratively in successive development environments of a software development lifecycle. In an aspect of this embodiment, the second configuration change that resolves the second recently unused security misconfiguration is automatically implemented at step 306 iteratively in the successive development environments of the software development lifecycle prior to deploying a version of the cloud native application that comprises the second configuration change to production.

At step 308, a governance policy, which defines a security action to perform with regard to a future attempt to implement the second recently unused security misconfiguration, is automatically generated as the result of the second configuration change being capable of compromising access of the end user to the version of the cloud native application. In an aspect, the governance policy is automatically generated further as the result of the second recently unused security misconfiguration being unused for at least the designated duration of time that ends at the current time. In an example implementation, the policy generation logic 418 automatically generates the governance policy as the result of the second configuration change being capable of compromising access of the end user to the version of the cloud native application 428.

In an example embodiment, the security action, which is defined by the governance policy, comprises generating a security alert that notifies an information technology (IT) professional about the future attempt to implement the second recently unused security misconfiguration.

In another example embodiment, the security action, which is defined by the governance policy, comprises ignoring an attempt to implement the second recently unused security misconfiguration.

In yet another example embodiment, the security action, which is defined by the governance policy, comprises issuing an error in response to an attempt to implement the second recently unused security misconfiguration, the error indicating that implementation of the second recently unused security misconfiguration is disallowed.

In still another example embodiment, the governance policy is automatically generated at step 308 prior to deployment of a version of the cloud native application that comprises the second recently unused security misconfiguration in a cloud environment.

In some example embodiments, one or more steps 302, 304, 306, and/or 308 of flowchart 300 may not be performed. Moreover, steps in addition to or in lieu of steps 302, 304, 306, and/or 308 may be performed. For instance, in an example embodiment, the method of flowchart 300 further includes automatically generating a second governance policy, which defines a security action to perform with regard to a future attempt to implement the first recently unused security misconfiguration, as the result of the first configuration change being capable of reducing the productivity of the user of the cloud native application who has the uncompromised access to the cloud native application and having the likelihood of reducing the security of the cloud native application that is greater than or equal to the likelihood threshold. In an example implementation, the policy generation logic 418 automatically generates the second governance policy, which defines the security action to perform with regard to the future attempt to implement the first recently unused security misconfiguration. In an aspect, the policy generation logic 418 analyzes the categorized recency information 434 to identify the first recently unused security misconfiguration.

In another example embodiment, the method of flowchart 200 further includes generating a user interface that enables a user to undo an implementation of the first configuration change that resolves the first recently unused security misconfiguration and/or an implementation of the second configuration change that resolves the second recently unused security misconfiguration. In an example implementation, the user interface logic 420 generates a user interface 438 that includes an undo interface element 440, which enables the user to undo the implementation of the first configuration change that resolves the first recently unused security misconfiguration and/or the implementation of the second configuration change that resolves the second recently unused security misconfiguration.

It will be recognized that the computing system 400 may not include one or more of the governance policy-based misconfiguration resolution logic 408, the store 410, the categorization logic 412, the implementation logic 414, the identification logic 416, the policy generation logic 418, and/or the user interface logic 420. Furthermore, the computing system 400 may include components in addition to or in lieu of the governance policy-based misconfiguration resolution logic 408, the store 410, the categorization logic 412, the implementation logic 414, the identification logic 416, the policy generation logic 418, and/or the user interface logic 420.

Figure 5:
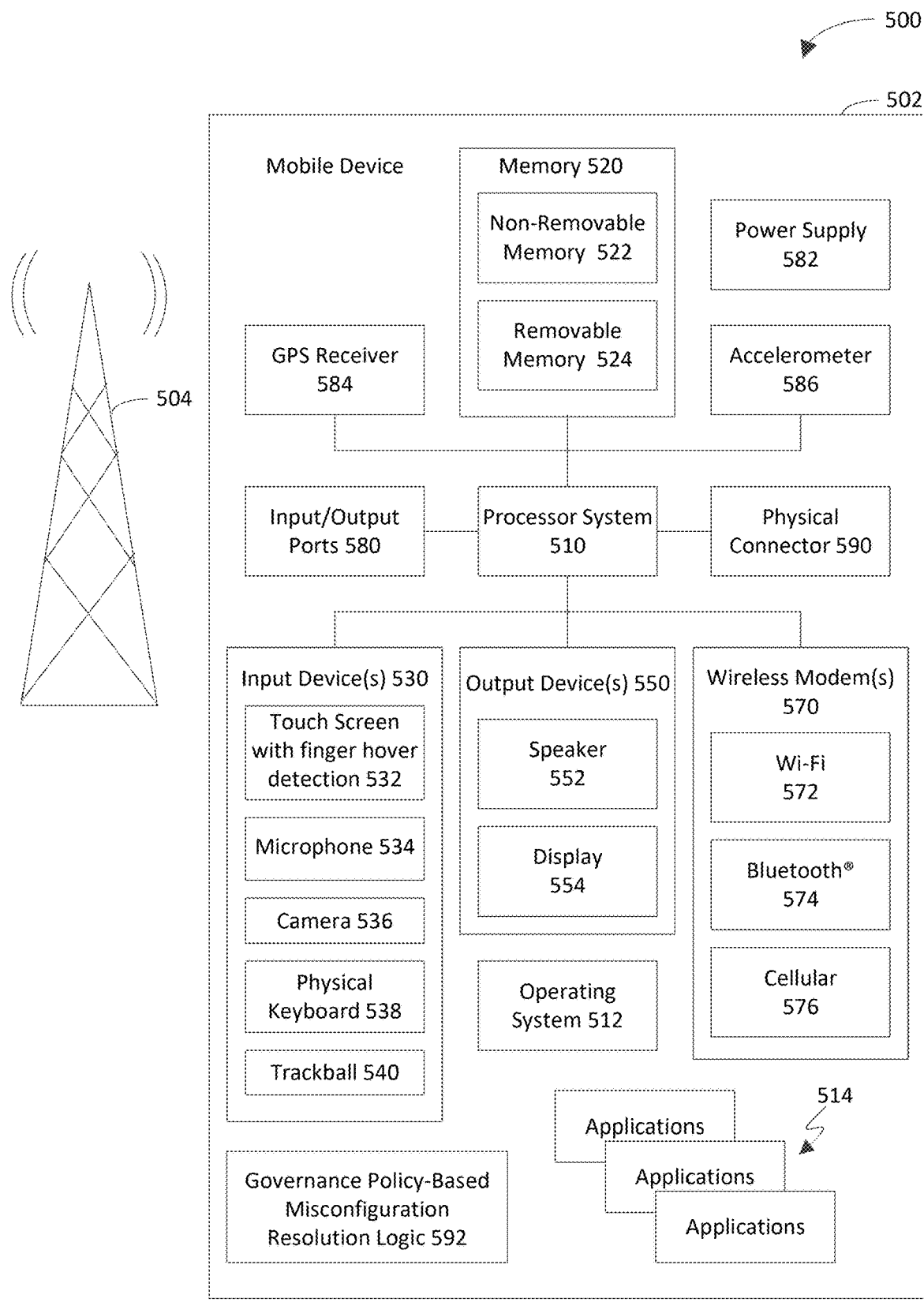
FIG. 5 is a system diagram of an example mobile device in accordance with an embodiment.

FIG. 5 is a system diagram of an example mobile device 500 including a variety of optional hardware and software components, shown generally as 502. Any components 502 in the mobile device may communicate with any other component, though not all connections are shown, for ease of illustration. The mobile device 500 may be any of a variety of computing devices (e.g., cell phone, smartphone, handheld computer, Personal Digital Assistant (PDA), etc.) and may allow wireless two-way communications with one or more mobile communications networks 504, such as a cellular or satellite network, or with a local area or wide area network.

The mobile device 500 includes a processor system 510 (e.g., signal processor, microprocessor, ASIC, or other control and processing logic circuitry) for performing such tasks as signal coding, data processing, input/output processing, power control, and/or other functions. An operating system 512 may control the allocation and usage of the components 502 and support for one or more applications 514 (a.k.a. application programs). The applications 514 may include common mobile computing applications (e.g., email applications, calendars, contact managers, web browsers, messaging applications) and any other computing applications (e.g., word processing applications, mapping applications, media player applications).

The mobile device 500 includes governance policy-based misconfiguration resolution logic 592, which is operable in a manner similar to the governance policy-based misconfiguration resolution logic 108 described above with reference to FIG. 1 and/or the governance policy-based misconfiguration resolution logic 408 described above with reference to FIG. 4.

The mobile device 500 includes memory 520. The memory 520 may include non-removable memory 522 and/or removable memory 524. The non-removable memory 522 may include random access memory (RAM), read-only memory (ROM), flash memory, a hard disk, or other well-known memory storage technologies. The removable memory 524 may include flash memory or a Subscriber Identity Module (SIM) card, which is well known in Global System for Mobile Communications (GSM) systems, or other well-known memory storage technologies, such as "smart cards." The memory 520 may store data and/or code for running the operating system 512 and the applications 514. Example data may include web pages, text, images, sound files, video data, or other data sets to be sent to and/or received from one or more network servers or other devices via one or more wired or wireless networks. Memory 520 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 500 may support one or more input devices 530, such as a touch screen 532, microphone 534, camera 536, physical keyboard 538 and/or trackball 540 and one or more output devices 550, such as a speaker 552 and a display 554. Touch screens, such as the touch screen 532, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 532 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 532 and display 554 may be combined in a single input/output device. The input devices 530 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (e.g., electroencephalography (EEG) and related methods). Thus, in one specific example, the operating system 512 or applications 514 may include speech-recognition software as part of a voice control interface that allows a user to operate the mobile device 500 via voice commands. Furthermore, the mobile device 500 may include input devices and software that allows for user interaction via a user's spatial gestures, such as detecting and interpreting gestures to provide input to a gaming application.

Wireless modem(s) 570 may be coupled to antenna(s) (not shown) and may support two-way communications between the processor system 510 and external devices, as is well understood in the art. The modem(s) 570 are shown generically and may include a cellular modem 576 for communicating with the mobile communication network 504 and/or other radio-based modems (e.g., Bluetooth® 574 and/or Wi-Fi 572). At least one of the wireless modem(s) 570 is typically configured for communication with one or more cellular networks, such as a GSM network for data and voice communications within a single cellular network, between cellular networks, or between the mobile device and a public switched telephone network (PSTN).

The mobile device 500 may further include at least one input/output port 580, a power supply 582, a satellite navigation system receiver 584, such as a Global Positioning System (GPS) receiver, an accelerometer 586, and/or a physical connector 590, which may be a universal serial bus (USB) port, IEEE 1394 (FireWire) port, and/or RS-232 port. The illustrated components 502 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the governance policy-based misconfiguration resolution logic 108, the governance policy-based misconfiguration resolution logic 408, the store 410, the categorization logic 412, the implementation logic 414, the identification logic 416, the policy generation logic 418, the user interface logic 420, flowchart 200, and/or flowchart 300 may be implemented in hardware, software, firmware, or any combination thereof.

For example, any one or more of the governance policy-based misconfiguration resolution logic 108, the governance policy-based misconfiguration resolution logic 408, the store 410, the categorization logic 412, the implementation logic 414, the identification logic 416, the policy generation logic 418, the user interface logic 420, flowchart 200, and/or flowchart 300 may be implemented, at least in part, as computer program code configured to be executed in one or more processors.

In another example, any one or more of the governance policy-based misconfiguration resolution logic 108, the governance policy-based misconfiguration resolution logic 408, the store 410, the categorization logic 412, the implementation logic 414, the identification logic 416, the policy generation logic 418, the user interface logic 420, flowchart 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
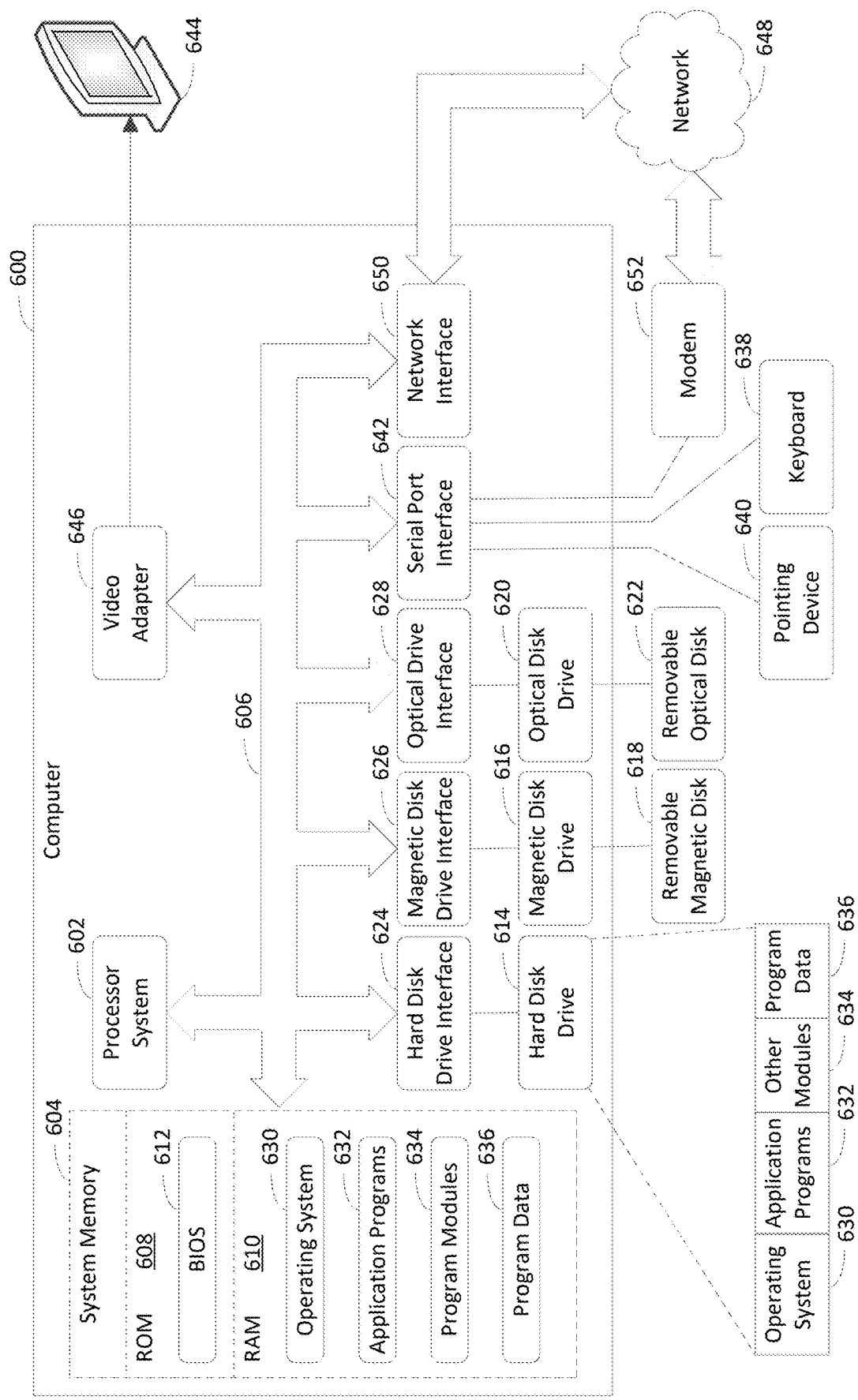
FIG. 6 depicts an example computer in which embodiments may be implemented.

II. Further Discussion of Some Example Embodiments (A1) An example system (FIG. 1, 102A-102M, 106A-106N; FIG. 4, 400; FIG. 5, 502; FIG. 6, 600) comprises a processor system (FIG. 5, 510; FIG. 6, 602) and a memory (FIG. 5, 520, 522, 524; FIG. 6, 604, 608, 610) that stores computer-executable instructions. The computer-executable instructions are executable by the processor system to at least categorize (FIG. 2, 202) first configuration changes, which are comprised in a plurality of configuration changes that are configured to resolve a plurality of security misconfigurations of a cloud native application (FIG. 4, 428), into a first category as a result of the first configuration changes being capable of reducing productivity of a user of the cloud native application who has uncompromised access to the cloud native application and having a likelihood of reducing security of the cloud native application that is greater than or equal to a likelihood threshold. The computer-executable instructions are executable by the processor system further to at least categorize (FIG. 2, 204) second configuration changes, which are comprised in the plurality of configuration changes, into a second category as a result of the second configuration changes being capable of compromising access of an end user to a version of the cloud native application. The computer-executable instructions are executable by the processor system further to at least identify (FIG. 2, 206) a plurality of recently unused security misconfigurations in the plurality of security misconfigurations as a result of the plurality of recently unused security misconfigurations being unused for at least a designated duration of time that ends at a current time. The computer-executable instructions are executable by the processor system further to at least automatically implement (FIG. 2, 208) the first configuration changes that resolve first recently unused security misconfigurations in the plurality of recently unused security misconfigurations. The computer-executable instructions are executable by the processor system further to at least automatically implement (FIG. 2, 210) the second configuration changes that resolve second recently unused security misconfigurations in the plurality of recently unused security misconfigurations. The computer-executable instructions are executable by the processor system further to at least automatically generate (FIG. 2, 212) governance policies (FIG. 4, 436), which define security actions to perform with regard to future attempts to implement the second recently unused security misconfigurations.

(A2) In the example system of A1, wherein the computer-executable instructions are executable by the processor system to at least: automatically generate a governance policy, which defines a security action that comprises generating a security alert that notifies an information technology (IT) professional about an attempt to implement a second recently unused security misconfiguration in the plurality of recently unused security misconfigurations.

(A3) In the example system of any of A1-A2, wherein the computer-executable instructions are executable by the processor system to at least: automatically generate a governance policy, which defines a security action that comprises ignoring an attempt to implement a second recently unused security misconfiguration in the plurality of recently unused security misconfigurations.

(A4) In the example system of any of A1-A3, wherein the computer-executable instructions are executable by the processor system to at least: automatically generate a governance policy, which defines a security action that comprises issuing an error in response to an attempt to implement a second recently unused security misconfiguration in the plurality of recently unused security misconfigurations, the error indicating that implementation of the second recently unused security misconfiguration is disallowed.

(A5) In the example system of any of A1-A4, wherein the computer-executable instructions are executable by the processor system to at least: automatically implement the first configuration changes that resolve the first recently unused security misconfigurations by automatically revoking a personal access token associated with the cloud native application.

(A6) In the example system of any of A1-A5, wherein the computer-executable instructions are executable by the processor system to at least: automatically implement the first configuration changes that resolve the first recently unused security misconfigurations by automatically revoking a secure shell key associated with the cloud native application.

(A7) In the example system of any of A1-A6, wherein the computer-executable instructions are executable by the processor system further to at least: automatically generate other governance policies, which define security actions to perform with regard to future attempts to implement the first recently unused security misconfigurations.

(A8) In the example system of any of A1-A7, wherein the computer-executable instructions are executable by the processor system to at least: automatically implement the second configuration changes that resolve the second recently unused security misconfigurations by automatically revoking a service principal name associated with the cloud native application.

(A9) In the example system of any of A1-A8, wherein the computer-executable instructions are executable by the processor system to at least: automatically implement the second configuration changes that resolve the second recently unused security misconfigurations by automatically revoking access to a control plane associated with the cloud native application.

(A10) In the example system of any of A1-A9, wherein the computer-executable instructions are executable by the processor system to at least: automatically implement the second configuration changes that resolve the second recently unused security misconfigurations by automatically revoking access to a machine identity that is used to control a number of nodes that are allocated to run instances of the cloud native application such that the number of nodes corresponds to an amount of incoming traffic that is directed to the cloud native application.

(A11) In the example system of any of A1-A10, wherein the computer-executable instructions are executable by the processor system to at least: automatically implement the second configuration changes that resolve the second recently unused security misconfigurations by automatically revoking access to a database that is used by the cloud native application.

(A12) In the example system of any of A1-A11, wherein the computer-executable instructions are executable by the processor system to at least: automatically implement the second configuration changes that resolve the second recently unused security misconfigurations by automatically revoking access to a secret in a key vault that is used by the cloud native application.

(A13) In the example system of any of A1-A12, wherein the computer-executable instructions are executable by the processor system to at least: automatically implement the first configuration changes that resolve the first recently unused security misconfigurations by automatically implementing the first configuration changes that resolve the first recently unused security misconfigurations iteratively in successive development environments of a software development lifecycle.

(A14) In the example system of any of A1-A13, wherein the computer-executable instructions are executable by the processor system to at least: automatically implement the first configuration changes that resolve the first recently unused security misconfigurations by automatically implementing designated changes, which comprise the first configuration changes that resolve the first recently unused security misconfigurations, iteratively in the successive development environments of the software development lifecycle prior to deploying a version of the cloud native application that comprises the designated changes to production.

(A15) In the example system of any of A1-A14, wherein the computer-executable instructions are executable by the processor system to at least: automatically implement the second configuration changes that resolve the second recently unused security misconfigurations iteratively in successive development environments of a software development lifecycle.

(A16) In the example system of any of A1-A15, wherein the computer-executable instructions are executable by the processor system to at least: automatically implement designated changes, which comprise the second configuration changes that resolve the second recently unused security misconfigurations, iteratively in the successive development environments of the software development lifecycle prior to deploying a version of the cloud native application that comprises the designated changes to production.

(A17) In the example system of any of A1-A16, wherein the computer-executable instructions are executable by the processor system further to at least: generate a user interface that enables a user to undo at least one of an implementation of a first configuration change that resolves a first recently unused security misconfigurations in the plurality of recently unused security misconfigurations or an implementation of a second configuration change that resolves a second recently unused security misconfigurations in the plurality of recently unused security misconfigurations.

(A18) In the example system of any of A1-A17, wherein the first recently unused security misconfigurations comprise a first recently unused security misconfiguration that grants a user individual access, rather than group access, to the cloud native application.

(A19) In the example system of any of A1-A18, wherein the computer-executable instructions are executable by the processor system to at least: prior to deployment of a version of the cloud native application that comprises the first recently unused security misconfigurations and the second recently unused security misconfigurations in a cloud environment, automatically implement the first configuration changes that resolve the first recently unused security misconfigurations and automatically implement the second configuration changes that resolve the second recently unused security misconfigurations.

(A20) In the example system of any of A1-A19, wherein the computer-executable instructions are executable by the processor system to at least: automatically generate the governance policies prior to deployment of a version of the cloud native application that comprises the second recently unused security misconfigurations in a cloud environment.

(B1) An example method is implemented by a computing system (FIG. 1, 102A-102M, 106A-106N; FIG. 4, 400; FIG. 5, 502; FIG. 6, 600). The method comprises identifying (FIG. 3, 302) a plurality of recently unused security misconfigurations in a plurality of security misconfigurations of a cloud native application (FIG. 4, 428) as a result of the plurality of recently unused security misconfigurations being unused for at least a designated duration of time that ends at a current time. The method further comprises automatically implementing (FIG. 3, 304) a first configuration change that resolves a first recently unused security misconfiguration in the plurality of recently unused security misconfigurations as a result of the first configuration change being capable of reducing productivity of a user of the cloud native application who has uncompromised access to the cloud native application and having a likelihood of reducing security of the cloud native application that is greater than or equal to a likelihood threshold. The method further comprises automatically implementing (FIG. 3, 306) a second configuration change that resolves a second recently unused security misconfiguration in the plurality of recently unused security misconfigurations as a result of the second configuration change being capable of compromising access of an end user to a version of the cloud native application. The method further comprises automatically generating (FIG. 3, 308) a governance policy, which defines a security action to perform with regard to a future attempt to implement the second recently unused security misconfiguration, as the result of the second configuration change being capable of compromising access of the end user to the version of the cloud native application.

(B2) In the example method of B1, wherein the security action, which is defined by the governance policy, comprises generating a security alert that notifies an information technology (IT) professional about the future attempt to implement the second recently unused security misconfiguration.

(B3) In the example method of any of B1-B2, wherein the security action, which is defined by the governance policy, comprises ignoring an attempt to implement the second recently unused security misconfiguration.

(B4) In the example method of any of B1-B3, wherein the security action, which is defined by the governance policy, comprises issuing an error in response to an attempt to implement the second recently unused security misconfiguration, the error indicating that implementation of the second recently unused security misconfiguration is disallowed.

(B5) In the example method of any of B1-B4, wherein automatically implementing the first configuration change that resolves the first recently unused security misconfiguration comprises: automatically revoking a personal access token associated with the cloud native application.

(B6) In the example method of any of B1-B5, wherein automatically implementing the first configuration change that resolves the first recently unused security misconfiguration comprises: automatically revoking a secure shell key associated with the cloud native application.

(B7) In the example method of any of B1-B6, further comprising: automatically generating a second governance policy, which defines a security action to perform with regard to a future attempt to implement the first recently unused security misconfiguration, as the result of the first configuration change being capable of reducing the productivity of the user of the cloud native application who has the uncompromised access to the cloud native application and having the likelihood of reducing the security of the cloud native application that is greater than or equal to the likelihood threshold.

(B8) In the example method of any of B1-B7, wherein automatically implementing the second configuration change that resolves the second recently unused security misconfiguration comprises: automatically revoking a service principal name associated with the cloud native application.

(B9) In the example method of any of B1-B8, wherein automatically implementing the second configuration change that resolves the second recently unused security misconfiguration comprises: automatically revoking access to a control plane associated with the cloud native application.

(B10) In the example method of any of B1-B9, wherein automatically implementing the second configuration change that resolves the second recently unused security misconfiguration comprises: automatically revoking access to a machine identity that is used to control a number of nodes that are allocated to run instances of the cloud native application such that the number of nodes corresponds to an amount of incoming traffic that is directed to the cloud native application.

(B11) In the example method of any of B1-B10, wherein automatically implementing the second configuration change that resolves the second recently unused security misconfiguration comprises: automatically revoking access to a database that is used by the cloud native application.

(B12) In the example method of any of B1-B11, wherein automatically implementing the second configuration change that resolves the second recently unused security misconfiguration comprises: automatically revoking access to a secret in a key vault that is used by the cloud native application.

(B13) In the example method of any of B1-B12, wherein automatically implementing the first configuration change that resolves the first recently unused security misconfiguration comprises: automatically implementing the first configuration change that resolve the first recently unused security misconfiguration iteratively in successive development environments of a software development lifecycle.

(B14) In the example method of any of B1-B13, wherein automatically implementing the first configuration change that resolves the first recently unused security misconfiguration comprises: automatically implementing the first configuration change that resolve the first recently unused security misconfiguration iteratively in the successive development environments of the software development lifecycle prior to deploying a version of the cloud native application that comprises the first configuration change to production.

(B15) In the example method of any of B1-B14, wherein automatically implementing the second configuration change that resolves the second recently unused security misconfiguration comprises: automatically implementing the second configuration change that resolves the second recently unused security misconfiguration iteratively in successive development environments of a software development lifecycle.

(B16) In the example method of any of B1-B15, wherein automatically implementing the second configuration change that resolves the second recently unused security misconfiguration comprises: automatically implementing the second configuration change that resolves the second recently unused security misconfiguration iteratively in the successive development environments of the software development lifecycle prior to deploying a version of the cloud native application that comprises the second configuration change to production.

(B17) In the example method of any of B1-B16, further comprising: generating a user interface that enables a user to undo at least one of an implementation of the first configuration change that resolves the first recently unused security misconfiguration or an implementation of the second configuration change that resolves the second recently unused security misconfiguration.

(B18) In the example method of any of B1-B17, wherein the first recently unused security misconfiguration grants a user individual access, rather than group access, to the cloud native application.

(B19) In the example method of any of B1-B18, wherein automatically implementing the first configuration change that resolves the first recently unused security misconfiguration and automatically implementing the second configuration change that resolves the second recently unused security misconfiguration are performed prior to deployment of a version of the cloud native application that comprises the first recently unused security misconfiguration and the second recently unused security misconfiguration in a cloud environment.

(B20) In the example method of any of B1-B19, wherein automatically generating the governance policy is performed prior to deployment of a version of the cloud native application that comprises the second recently unused security misconfiguration in a cloud environment.

(C1) An example computer program product (FIG. 5, 524; FIG. 6, 618, 622) comprises a computer-readable storage medium having instructions recorded thereon for enabling a processor-based system (FIG. 1, 102A-102M, 106A-106N; FIG. 4, 400; FIG. 5, 502; FIG. 6, 600) to perform operations. The operations comprise identifying (FIG. 3, 302) first and second recently unused security misconfigurations of a cloud native application (FIG. 4, 428) that are unused for at least a designated period of time. The operations further comprise automatically implementing (FIG. 3, 304) a first configuration change that resolves the first recently unused security misconfiguration as a result of the first configuration change being capable of reducing productivity of a user of the cloud native application who has uncompromised access to the cloud native application and having at least a threshold likelihood of reducing security of the cloud native application. The operations further comprise automatically implementing (FIG. 3, 306) a second configuration change that resolves the second recently unused security misconfiguration as a result of the second configuration change being capable of compromising access of an end user to a version of the cloud native application. The operations further comprise automatically generating (FIG. 3, 308) a governance policy, which defines a security action to perform with regard to a future attempt to implement the second recently unused security misconfiguration.

III. Example Computer System

FIG. 6 depicts an example computer 600 in which embodiments may be implemented. Any one or more of the user devices 102A-102M and/or any one or more of the servers 106A-106N shown in FIG. 1 and/or the computing system 400 shown in FIG. 4 may be implemented using computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processor system 602, a system memory 604, and a bus 606 that couples various system components including system memory 604 to processor system 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, computer program logic for implementing any one or more of (e.g., at least a portion of) the governance policy-based misconfiguration resolution logic 108, the governance policy-based misconfiguration resolution logic 408, the store 410, the categorization logic 412, the implementation logic 414, the identification logic 416, the policy generation logic 418, the user interface logic 420, flowchart 200 (including any step of flowchart 200), and/or flowchart 300 (including any step of flowchart 300), as described herein.

A user may enter commands and information into the computer 600 through input devices such as keyboard 638 and pointing device 640. Other input devices (not shown) may include a microphone, joystick, game pad, satellite dish, scanner, touch screen, camera, accelerometer, gyroscope, or the like. These and other input devices are often connected to the processor system 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable storage medium" are used to generally refer to media (e.g., non-transitory media) such as the hard disk associated with hard disk drive 614, removable magnetic disk 618, removable optical disk 622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
    a processor system; and
    a memory that stores computer-executable instructions that are executable by the processor system to at least:
        categorize first configuration changes, which are comprised in a plurality of configuration changes that are configured to resolve a plurality of security misconfigurations of a cloud native application, into a first category as a result of the first configuration changes being capable of reducing productivity of a user of the cloud native application who has uncompromised access to the cloud native application and having a likelihood of reducing security of the cloud native application that is greater than or equal to a likelihood threshold;
        categorize second configuration changes, which are comprised in the plurality of configuration changes, into a second category as a result of the second configuration changes being capable of compromising access of an end user to a version of the cloud native application;
        identify a plurality of recently unused security misconfigurations in the plurality of security misconfigurations as a result of the plurality of recently unused security misconfigurations being unused for at least a designated duration of time that ends at a current time;
        automatically implement the first configuration changes that resolve first recently unused security misconfigurations in the plurality of recently unused security misconfigurations;
        automatically implement the second configuration changes that resolve second recently unused security misconfigurations in the plurality of recently unused security misconfigurations; and
        automatically generate governance policies, which define security actions to perform with regard to future attempts to implement the second recently unused security misconfigurations.

2. The system of claim 1, wherein the computer-executable instructions are executable by the processor system to perform at least one of the following:
    automatically generate a first governance policy, which defines a first security action that comprises generating a security alert that notifies an information technology (IT) professional about an attempt to implement a second recently unused security misconfiguration in the plurality of recently unused security misconfigurations;
    automatically generate a second governance policy, which defines a second security action that comprises ignoring an attempt to implement a second recently unused security misconfiguration in the plurality of recently unused security misconfigurations; or
    automatically generate a third governance policy, which defines a third security action that comprises issuing an error in response to an attempt to implement a second recently unused security misconfiguration in the plurality of recently unused security misconfigurations, the error indicating that implementation of the second recently unused security misconfiguration is disallowed.

3. The system of claim 1, wherein the computer-executable instructions are executable by the processor system to at least:
    automatically implement the first configuration changes that resolve the first recently unused security misconfigurations by automatically revoking at least one of the following:
        a personal access token associated with the cloud native application; or
        a secure shell key associated with the cloud native application.

4. The system of claim 1, wherein the computer-executable instructions are executable by the processor system further to at least:
    automatically generate other governance policies, which define security actions to perform with regard to future attempts to implement the first recently unused security misconfigurations.

5. The system of claim 1, wherein the computer-executable instructions are executable by the processor system to at least:
    automatically implement the second configuration changes that resolve the second recently unused security misconfigurations by automatically revoking at least one of the following:
        a service principal name associated with the cloud native application; or
        access to a control plane associated with the cloud native application.

6. The system of claim 1, wherein the computer-executable instructions are executable by the processor system to at least:
    automatically implement the second configuration changes that resolve the second recently unused security misconfigurations by automatically revoking at least one of the following:
        access to a machine identity that is used to control a number of nodes that are allocated to run instances of the cloud native application such that the number of nodes corresponds to an amount of incoming traffic that is directed to the cloud native application;
        access to a database that is used by the cloud native application; or
        access to a secret in a key vault that is used by the cloud native application.

7. The system of claim 1, wherein the computer-executable instructions are executable by the processor system to at least:
    automatically generate the governance policies prior to deployment of a version of the cloud native application that comprises the second recently unused security misconfigurations in a cloud environment.

8. A method implemented by a computing system, the method comprising:
- identifying a plurality of recently unused security misconfigurations in a plurality of security misconfigurations of a cloud native application as a result of the plurality of recently unused security misconfigurations being unused for at least a designated duration of time that ends at a current time;
- automatically implementing a first configuration change that resolves a first recently unused security misconfiguration in the plurality of recently unused security misconfigurations as a result of the first configuration change being capable of reducing productivity of a user of the cloud native application who has uncompromised access to the cloud native application and having a likelihood of reducing security of the cloud native application that is greater than or equal to a likelihood threshold;
- automatically implementing a second configuration change that resolves a second recently unused security misconfiguration in the plurality of recently unused security misconfigurations as a result of the second configuration change being capable of compromising access of an end user to a version of the cloud native application; and
- automatically generating a governance policy, which defines a security action to perform with regard to a future attempt to implement the second recently unused security misconfiguration, as the result of the second configuration change being capable of compromising access of the end user to the version of the cloud native application.

9. The method of claim 8, wherein the security action, which is defined by the governance policy, comprises generating a security alert that notifies an information technology (IT) professional about the future attempt to implement the second recently unused security misconfiguration.

10. The method of claim 8, wherein the security action, which is defined by the governance policy, comprises ignoring an attempt to implement the second recently unused security misconfiguration.

11. The method of claim 8, wherein the security action, which is defined by the governance policy, comprises issuing an error in response to an attempt to implement the second recently unused security misconfiguration, the error indicating that implementation of the second recently unused security misconfiguration is disallowed.

12. The method of claim 8, wherein automatically implementing the first configuration change that resolves the first recently unused security misconfiguration comprises:
- automatically implementing the first configuration change that resolves the first recently unused security misconfiguration iteratively in successive development environments of a software development lifecycle.

13. The method of claim 12, wherein automatically implementing the first configuration change that resolves the first recently unused security misconfiguration comprises:
- automatically implementing the first configuration change that resolve the first recently unused security misconfiguration iteratively in the successive development environments of the software development lifecycle prior to deploying a version of the cloud native application that comprises the first configuration change to production.

14. The method of claim 8, wherein automatically implementing the second configuration change that resolves the second recently unused security misconfiguration comprises:
- automatically implementing the second configuration change that resolves the second recently unused security misconfiguration iteratively in successive development environments of a software development lifecycle.

15. The method of claim 14, wherein automatically implementing the second configuration change that resolves the second recently unused security misconfiguration comprises:
- automatically implementing the second configuration change that resolves the second recently unused security misconfiguration iteratively in the successive development environments of the software development lifecycle prior to deploying a version of the cloud native application that comprises the second configuration change to production.

16. The method of claim 8, further comprising:
- generating a user interface that enables a user to undo at least one of an implementation of the first configuration change that resolves the first recently unused security misconfiguration or an implementation of the second configuration change that resolves the second recently unused security misconfiguration.

17. The method of claim 8, wherein the first recently unused security misconfiguration grants a user individual access, rather than group access, to the cloud native application.

18. The method of claim 8, wherein automatically implementing the first configuration change that resolves the first recently unused security misconfiguration and automatically implementing the second configuration change that resolves the second recently unused security misconfiguration are performed prior to deployment of a version of the cloud native application that comprises the first recently unused security misconfiguration and the second recently unused security misconfiguration in a cloud environment.

19. The method of claim 8, wherein automatically generating the governance policy is performed prior to deployment of a version of the cloud native application that comprises the second recently unused security misconfiguration in a cloud environment.

20. A computer program product comprising a computer-readable storage medium having instructions recorded thereon for enabling a processor-based system to perform operations, the operations comprising:
- identifying first and second recently unused security misconfigurations of a cloud native application that are unused for at least a designated period of time;
- automatically implementing a first configuration change that resolves the first recently unused security misconfiguration as a result of the first configuration change being capable of reducing productivity of a user of the cloud native application who has uncompromised access to the cloud native application and having at least a threshold likelihood of reducing security of the cloud native application;
- automatically implementing a second configuration change that resolves the second recently unused security misconfiguration as a result of the second configuration change being capable of compromising access of an end user to a version of the cloud native application; and automatically generating a governance policy, which defines a security action to perform with regard to a future attempt to implement the second recently unused security misconfiguration, as the result of the second configuration change being capable of compromising access of the end user to the version of the cloud native application.

* * * * *